(12) United States Patent
Khambati et al.

(10) Patent No.: US 11,440,719 B1
(45) Date of Patent: Sep. 13, 2022

(54) TAMPER INDICATOR FOR SELF-ADJUSTING SHIPPING BOX

(71) Applicant: INTERNATIONAL BUSINESS MACHINES CORPORATION, Armonk, NY (US)

(72) Inventors: Suraush Khambati, Poughkeepsie, NY (US); Budy Notohardjono, Poughkeepsie, NY (US); Richard M. Ecker, Poughkeepsie, NY (US); Shawn Canfield, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/380,061

(22) Filed: Jul. 20, 2021

(51) Int. Cl.
| | |
|---|---|
| *B65D 81/05* | (2006.01) |
| *B65D 5/50* | (2006.01) |
| *B65D 5/42* | (2006.01) |
| *B31B 50/80* | (2017.01) |
| *B31B 105/00* | (2017.01) |

(Continued)

(52) U.S. Cl.
CPC ............ *B65D 81/052* (2013.01); *B31B 50/80* (2017.08); *B65D 5/4212* (2013.01); *B65D 5/5028* (2013.01); *B31B 2105/00* (2017.08); *B31B 2110/35* (2017.08); *B31B 2120/102* (2017.08); *B65D 2401/55* (2020.05)

(58) Field of Classification Search
CPC .... B65D 81/20; B65D 5/4212; B65D 5/5028; B65D 2401/55; B65D 2203/10; B65D 2203/00; B65D 55/026; B65D 51/2814; B65D 51/2835; B65D 51/285; B65B 50/80; B65B 2105/00; B65B 2110/35; B65B 2120/102; G08B 13/08

See application file for complete search history.

(56) References Cited

U.S. PATENT DOCUMENTS

| 4,793,489 | A | * | 12/1988 | Israel | B65D 55/028 |
| | | | | | 116/202 |
| 4,905,835 | A | * | 3/1990 | Pivert | B65D 81/052 |
| | | | | | 383/3 |

(Continued)

FOREIGN PATENT DOCUMENTS

| CN | 101175677 B | 7/2011 |
| EP | 2801537 A1 | 11/2014 |
| KR | 10025367 B1 | 4/2000 |

OTHER PUBLICATIONS

Mooney et al., "Comparison of Pressure Distribution Qualities in Seat Cushions", Bulletin of Prosthetics Research, Spring 1971, pp. 1-15.

*Primary Examiner* — Joshua G Kotis
*Assistant Examiner* — Scott A Howell
(74) *Attorney, Agent, or Firm* — Tihon Poltavets

(57) ABSTRACT

A shipping box includes a plurality of sides and a plurality of bladders. The sides are arranged as a rectangular solid with fixed sides and a top side. The top side includes an openable cover for access to an interior of the rectangular solid. The rectangular solid has a size determined based on dimensions of an object placed in the interior of the rectangular solid. The bladders are arranged on each of the sides and configured to be inflated as a cushioning mechanism for the object while placed in the interior of the rectangular solid. The bladders are made of a material based on a weight of the at least one object.

8 Claims, 13 Drawing Sheets

(51) Int. Cl.
  *B31B 110/35* (2017.01)
  *B31B 120/10* (2017.01)

(56) References Cited

U.S. PATENT DOCUMENTS

| | | | | |
|---|---|---|---|---|
| 5,060,848 | A * | 10/1991 | Ewan | B65D 33/34 229/162.1 |
| 5,564,570 | A * | 10/1996 | Jaszai | B65D 81/1075 206/219 |
| 5,617,812 | A * | 4/1997 | Balderson | B65D 81/2069 215/230 |
| 5,727,686 | A * | 3/1998 | Kristal | B65D 27/30 53/562 |
| 5,769,232 | A * | 6/1998 | Cash | B65D 81/052 383/3 |
| 6,253,806 | B1 * | 7/2001 | Sperry | B65B 55/20 141/10 |
| 6,990,788 | B2 | 1/2006 | Peterse | |
| 7,659,816 | B2 * | 2/2010 | Wandel | B65D 55/026 340/572.8 |
| 7,913,847 | B2 * | 3/2011 | Kasboske | B65D 81/052 206/592 |
| 8,205,750 | B2 * | 6/2012 | Kim | B65D 81/052 206/522 |
| 8,800,978 | B2 | 8/2014 | Tarazona De La Asuncion | |
| 9,004,758 | B2 * | 4/2015 | Frayne | B65D 31/14 383/44 |
| 9,067,721 | B2 | 6/2015 | Mullaney | |
| 9,085,405 | B2 * | 7/2015 | Frayne | F16K 15/20 |
| 10,131,428 | B1 | 11/2018 | Sopper | |
| 10,926,934 | B2 * | 2/2021 | Buelna | B65D 81/052 |
| 2003/0006162 | A1 * | 1/2003 | Smith | B65D 81/027 206/583 |
| 2006/0272288 | A1 * | 12/2006 | Kannankeril | B65D 81/052 53/472 |
| 2014/0033645 | A1 | 2/2014 | Van Uijen | |
| 2014/0224699 | A1 * | 8/2014 | Smith | B65B 5/06 206/522 |
| 2017/0032065 | A1 | 2/2017 | Blug | |
| 2017/0205357 | A1 * | 7/2017 | Burgess | G01N 31/225 |
| 2020/0039719 | A1 | 2/2020 | Wang | |

* cited by examiner

US 11,440,719 B1

TAMPER INDICATOR FOR SELF-ADJUSTING SHIPPING BOX

BACKGROUND

The exemplary embodiments relate generally to a shipping box, and more particularly to a shipping box that is reusable with a tamper mechanism indicating when the shipping box has been tampered and self-adjusting to accommodate an object placed therein.

Packaging may involve a significant amount of waste in terms of unused space of a shipping box, air pockets and/or other cushioning to prevent damage to an object placed in the shipping box, etc. Packaging may also involve inefficient means of sending an object from one location to another. For example, an object may have a size but be placed in a shipping box with a volume that is substantially larger. In this scenario, the combination of this object and the shipping box requires an increased amount of cushioning to compensate for the wasted volume not being utilized. Conventional approaches also utilize the air pockets or cushioning material in a loose manner where the object and/or the air pockets placed in the shipping box are not tied and allowed to freely move. Thus, during transit, the object may be susceptible to damage whenever the shipping box is moved in an undesirable way. In addition, conventional approaches may require manual intervention during or after packaging that further increases waste in terms of time and inefficient packing support.

SUMMARY

The exemplary embodiments disclose a shipping box. The shipping box comprises a plurality of sides and a plurality of bladders. The plurality of sides is arranged as a rectangular solid. The sides include fixed sides and a top side. The top side includes an openable cover for access to an interior of the rectangular solid. The rectangular solid has a size determined based on dimensions of at least one object placed in the interior of the rectangular solid. The plurality of bladders is arranged on each of the sides. The bladders are configured to be inflated as a cushioning mechanism for the at least one object while placed in the interior of the rectangular solid. The bladders are made of a material based on a weight of the at least one object.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
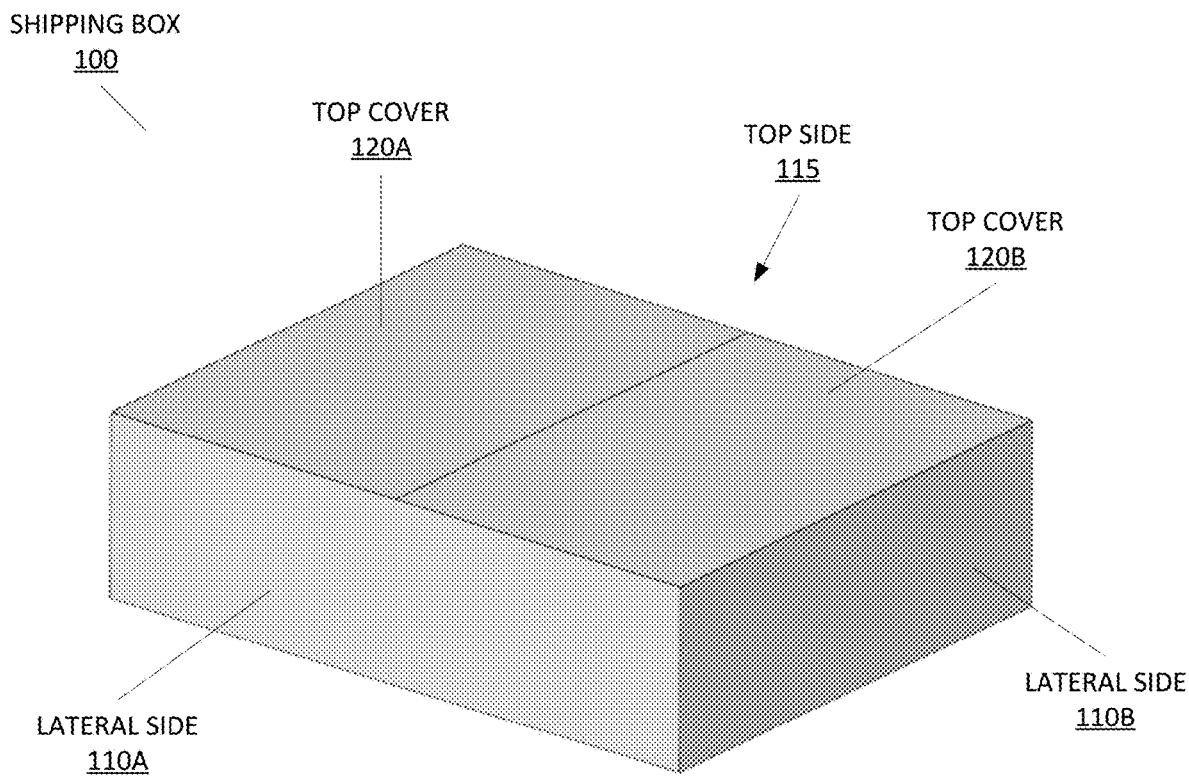
FIG. 1 depicts a closed view of an exemplary shipping box 100 with bladders 125 that are deflated, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a shipping box and a method for assembling the shipping box. The shipping box according to the exemplary embodiments is configured to be reusable. The shipping box may include fixed cushioning features placed within an interior of the shipping box where the cushioning features are also reusable. The shipping box and the cushioning features may be dynamically selected based on the needs and/or preferences in packaging an object for shipping. The exemplary embodiments are also directed to a tamper mechanism with an unreversible indicator representing when the shipping box has been tampered. Key benefits of the exemplary embodiments may include providing a means to package and ship objects using a shipping box that reduces waste on an individual scale with regard to shippers and receivers as well as on a global scale with regard to reduction of waste products. Detailed implementation of the exemplary embodiments follows.

Individuals, vendors, consumers, etc. have packaged and shipped objects through personal efforts or through various mailing services that are available. The Internet and an increasing online consumer presence have increased the amount of objects that are packaged and shipped. With conventional packaging and shipping services, materials and processes that minimize financial cost may take precedence over other concerns. Accordingly, various negative results may occur. For example, objects may be shipped in oversized shipping boxes that may cause the object to be damaged in transit (e.g., due to increased movement within the shipping box), may require additional cushioning components (e.g., additional air pockets to fill empty volume of the shipping box), etc. When objects are damaged, even further packaging and shipping may be required that unnecessarily increase waste. Furthermore, conventional approaches may inadvertently provide opportunities for the shipping box to be tampered with prior to delivery. For example, an entity or individual may intercept a shipping box, open the box, and tamper with the object or contents therein before being delivered to the destination. The receiver of the shipping box may be entirely unaware that anything has occurred. Even when the shipping box is received with marks that are indicative of tampering, the receiver may simply assume that the shipping box was damaged in transit rather than having been tampered.

There have been conventional approaches that attempt to address cushioning concerns or tampering concerns. For example, a conventional approach provides an inflatable packaging for use with an unmanned aerial vehicle (UAV). The conventional approach provides an inflatable package enclosure in which an object is placed in an interior thereof such that inflation holds the object in place. The inflated package enclosure includes a handle for coupling to the UAV for delivery. However, this conventional approach is directed specifically for UAV deliveries and is not applicable to shipping boxes. In another example, a conventional approach provides a mechanism to determine a material for a sealing packing cushion such that various operating parameters may be determined (e.g., temperature, seal pressure, air-fill levels, and operational timing). However, this conventional approach is merely a more sophisticated manner of utilizing air pockets to fill a volume of a shipping box. With regard to tampering concerns, conventional approaches are often not capable of being integrated into a shipping box, with particular regard to providing a first indicator when the shipping box is sealed and a second indicator when the shipping box has been tampered. Furthermore, the above noted conventional approaches are directed to single use solutions where the entire packaging and shipping materials are entirely or mostly replaced when another object is to be shipped.

The exemplary embodiments provide a shipping box that is reusable and provides its features with only a minimal replacement of parts for each time the shipping box is to be used. The cushioning mechanism according to the exemplary embodiments may be highly dynamic to accommodate various types and number of objects to be placed in the shipping box such that these objects are provided a cushioning effect while the shipping box is in transit. The cushioning mechanism may be reusable through repeated inflations and deflations. The exemplary embodiments may also integrate a tampering mechanism that is easily incorporated into the shipping box and replaceable with a new tampering mechanism for a further use of the shipping box.

The exemplary embodiments utilize terms designated with relative descriptors. For example, the shipping box is described generally as a rectangular solid with six faces. One of these faces is described herein as a bottom side while an opposing face is described herein as a top side with all other faces being lateral sides. However, the terms of top, bottom, and lateral regarding orientation or position are only for illustrative purposes and the exemplary embodiments may be utilized such that any surface may be any type of surface.

The exemplary embodiments are described with regard to a shipping box in which an object is packaged for delivery from a first location to a second location. However, the exemplary embodiments being directed toward this type of shopping box is only for illustrative purposes. The shipping box may represent any packaging means in which an object is housed in an apparatus designed to cushion the object within the apparatus and/or provide a tamper mechanism that indicates a presence of tampering with the apparatus prior to an intended opening of the apparatus.

Figure 2:
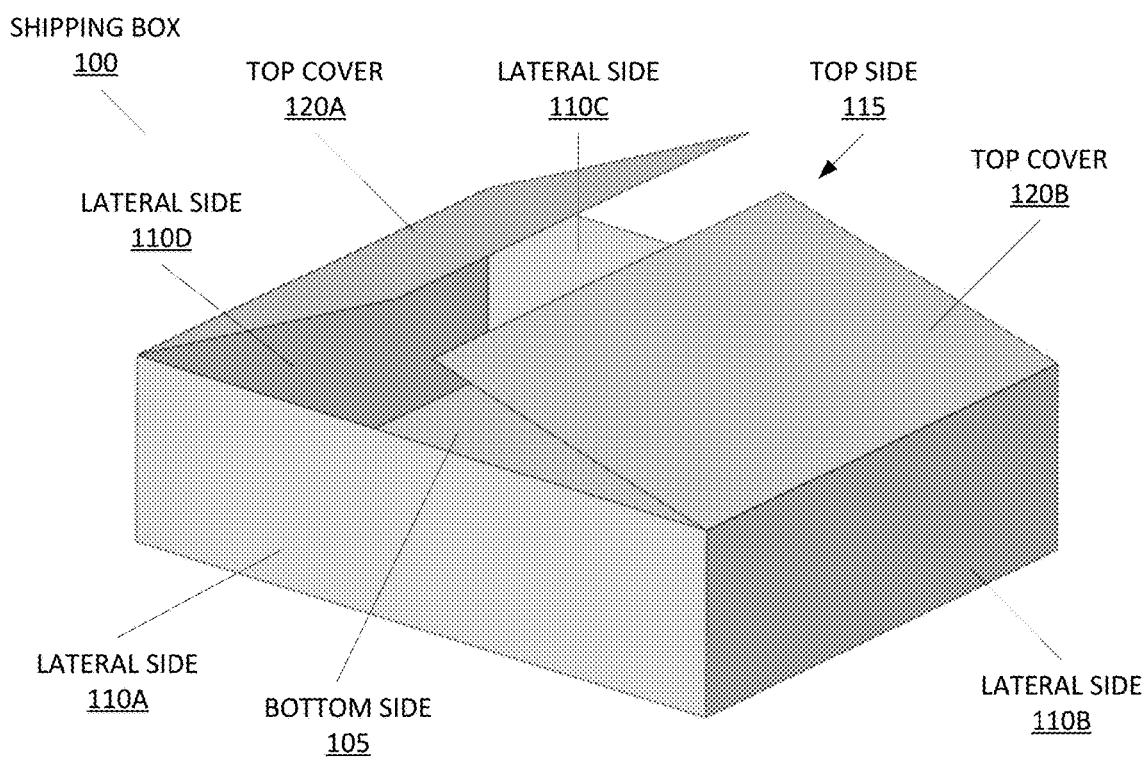
FIG. 2 depicts an open view of the exemplary shipping box 100 with bladders 125 that are deflated, in accordance with the exemplary embodiments.

FIGS. 1-2 depict an exemplary shipping box 100 in which bladders 125 are deflated, in accordance with the exemplary embodiments. Specifically, FIG. 1 depicts a closed view of the exemplary shipping box 100 and FIG. 2 depicts an open view of the exemplary shipping box 100. As illustrated, the shipping box 100 may substantially be a rectangular solid with six rectangular faces. The shipping box 100 being a rectangular solid is only illustrative and the exemplary embodiments may design the shipping box 100 in a variety of shapes that allow for the features described herein to be incorporated. The faces may include a bottom side 105, lateral sides 110A-D, and a top side 115. Each of the lateral sides 110A-D may share an edge with the bottom side 105 and the top side 115. Each of the lateral sides 110A-D may also share an edge with adjacent lateral sides 110A-D (e.g., the lateral side 110A shares a side with lateral side 110B and 110D). Being a rectangular solid, an angle formed at each of the shared edges from two of the sides (e.g., the bottom side 105, the lateral sides 110A-D, the top side 115) may be a right angle.

According to an exemplary embodiment, the bottom side 105 and the lateral sides 110A-D may be fixed faces (e.g., intended to be immovable). The top side 115 may include top covers 120A-B that are configured to pivot open. For example, as illustrated, the top cover 120A may pivot along the edge that is shared with the lateral side 110D and the top cover 120B may pivot along the edge that is shared with the lateral side 110B. Accordingly, the bottom side 105 and the lateral sides 110A-D may create a volume therein and access to the volume may be through the opening created from separating the top covers 120A-B on the top side 115. In the exemplary embodiment, the opening created from separating the top covers 120A-B may be along a central axis on the top side 115 where a free edge of the top cover 120A meets a free edge of the top cover 120B when the shipping box 100 is in a closed or sealed state. In the closed or sealed state, the free edges of the top covers 120A-B may meet at the central axis or may overlap.

The bottom side 105, the lateral sides 110A-D, and the top side 115 may be manufactured with any reusable material. For example, the shipping box 100 may be made of cardboard. The cardboard may be reinforced or modified so that the shipping box 100 may be reusable after a plurality of uses in packaging and delivery.

When deflated, the bladders 125 may exhibit a substantially planar surface that corresponds to an interior face of the bottom side 105, the lateral sides 110A-D, and the top side 115 of the shipping box 100. The bladders 125 in the deflated state may therefore provide a substantially similar volume as if the bladders 125 were not present in the shipping box 100. Those skilled in the art will understand that the material and amount of material used in manufacturing the bladders 125 may affect the size of the bladders in the deflated state. However, while deflated, the bladders 125 may be manufactured such that the volume of the interior of the shipping box 100 is decreased by a negligible amount (e.g., less than 5%). In an exemplary embodiment, the bladders 125 may be manufactured with rubber, silicone, polymer, etc. The bladders 125 are described in more detail below.

The bladders 125 may be attached to the interior faces of the bottom side 105, the lateral sides 110A-D, and the top side 115 using any attachment manner. For example, the bladders 125 may be attached to the interior of the shipping box 100 with an adhesive. In another example, the interior of the shipping box 100 and the bladders 125 may include a coupling mechanism that enables the bladders 125 to remain fixed in the shipping box 100. The coupling mechanism may also be reversible to detach the bladders. For example, the bladders 125 may be damaged and require replacement. To maintain reusability of the shipping box 100, the damaged bladders 125 may be replaced. As will be described in detail below, the bladders 125 may be fluidly interconnected or linked such that air may be pushed among the bladders 125. The fluid linkage may be via an air tube. Thus, any of the bladders 125 that are replaced may establish a fluid link to the air tube to maintain the fluid linkage among the bladders 125. This feature may also enable only the damaged bladder 125 to be replaced rather than the entire cushioning mechanism including all the bladders 125.

Figure 3:
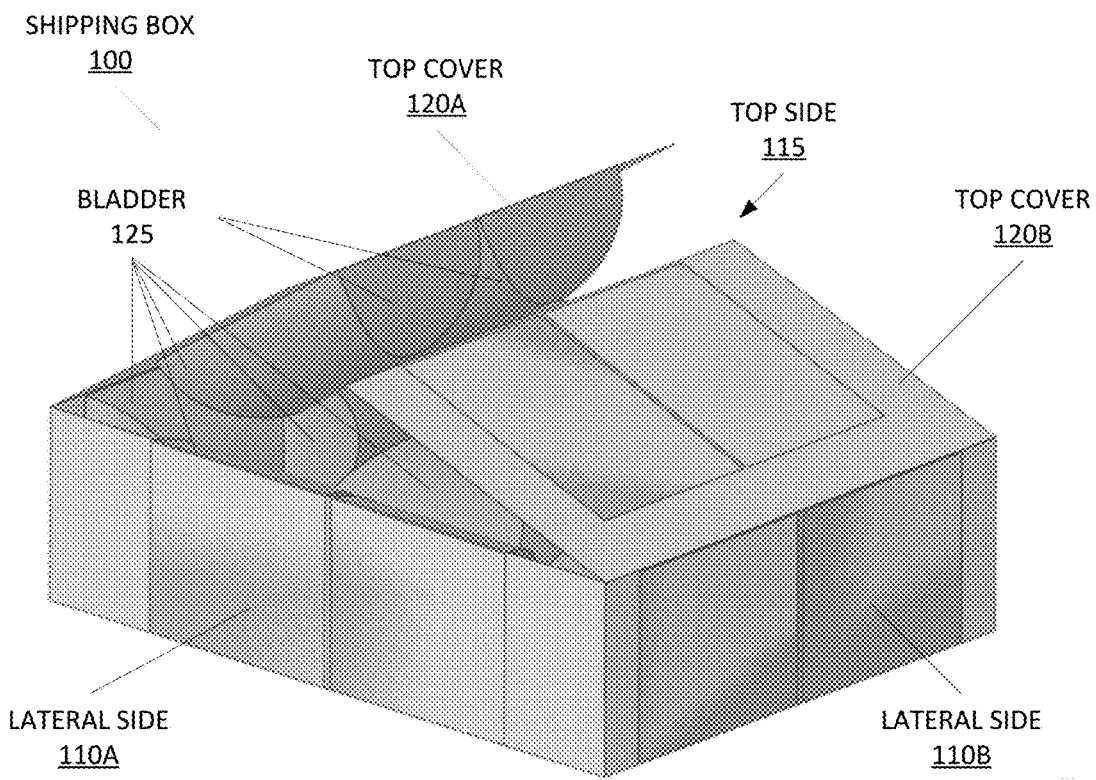
FIG. 3 depicts an open view of the exemplary shipping box 100 with bladders 125 that are inflated, in accordance with the exemplary embodiments.
Figure 4:
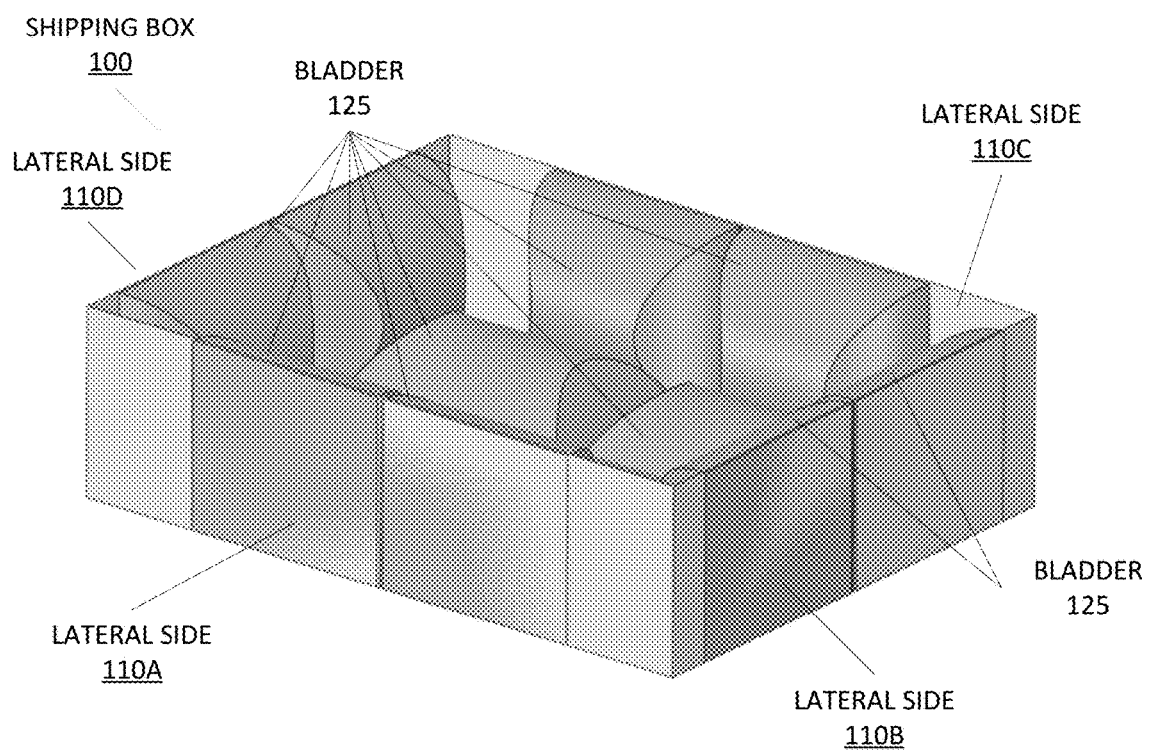
FIG. 4 depicts an interior view of the exemplary shipping box 100 with bladders 125 that are inflated, in accordance with the exemplary embodiments.

FIGS. 3-4 depict the exemplary shipping box 100 in which the bladders 125 are inflated, in accordance with the exemplary embodiments. Specifically, FIG. 3 depicts an open view of the exemplary shipping box 100 and FIG. 4 depicts an interior view of the exemplary shipping box 100. FIGS. 3-4 illustrate an exemplary embodiment where bladders 125 are incorporated on an interior side of each of the bottom side 105, the lateral sides 110A-D, and the top side 115. FIGS. 3-4 further illustrate the bladders 125 that are present on each interior face of the bottom side 105, the lateral sides 110A-D, and the top side 115. The bladders 125 in the inflated state may each occupy a bladder volume such that the volume in the interior of the shipping box 100 is decreased to a remaining volume. As will be described in further detail below, the remaining volume may be determined to accommodate dimensions of an object being placed in the shipping box 100.

In the exemplary embodiment, the bladders 125 may be arranged on each interior face of the bottom side 105, the lateral sides 110A-D, and the top side 115. Specifically, there may be eight bladders 125 where each bladder 125 forms a pair of air pockets. Each of the lateral sides 110A-D may include one of the bladders 125 while the bottom side 105 and the top side 115 may each include two of the bladders 125. As illustrated, the air pockets formed from one of the bladders 125 may be positioned adjacent one another. For example, the air pockets on the lateral side 110D may be formed from inflating the bladder 125 on the lateral side 110D. The air pockets on the other lateral sides 110A-C may be formed in a substantially similar manner with the bladders 125 on the corresponding ones of the lateral sides 110A-C. The air pockets on the bottom side 105 may be formed from inflating a first one of the bladders 125 extending across the bottom side 105 (e.g., from the lateral side 110A to the lateral side 110C, closer to the lateral side 110D) and from a second one of the bladders 125 also extending across the bottom side 105 (e.g., from the lateral side 110A to the lateral side 110C, closer to the lateral side 110B). The air pockets on the top side 115 may be formed from inflating a first one of the bladders 125 on an interior face of the top cover 120A and extending thereacross (e.g., from the lateral side 110A to the lateral side 110C, closer to the lateral side 110D) and from a second one of the bladders 125 on an interior face of the top cover 120B and extending thereacross (e.g., from the lateral side 110A to the lateral side 110C, closer to the lateral side 110B).

According to an exemplary embodiment, the air pockets formed by the bladders 125 in the inflated state may exhibit a substantially semicylindrical shape (e.g., a cylinder cut in half longitudinally along a longitudinal axis). The longitudinal ends of the air pockets may be angled toward a lateral axis of the corresponding air pocket. The angular configuration of the ends of the air pockets formed by the bladders 125 is only illustrative and the exemplary embodiments may incorporate other types of longitudinal ends (e.g., right angles with a length of the bladder 125). The air pockets may be arranged on the lateral sides 110A-D such that the air pockets are adjacent along a lateral length (e.g., a longitudinal end of a first air pocket formed by one of the bladders 125 is facing a longitudinal end of a second air pocket formed by the same one of the bladders 125). The air pockets may be arranged on the bottom side 105 and the top side 115 such that the air pockets are adjacent along a longitudinal length (e.g., a lateral side of a first air pocket formed by one of the bladders 125 is facing a lateral side of a second air pocket formed by the same one of the bladders 125).

Figure 5:
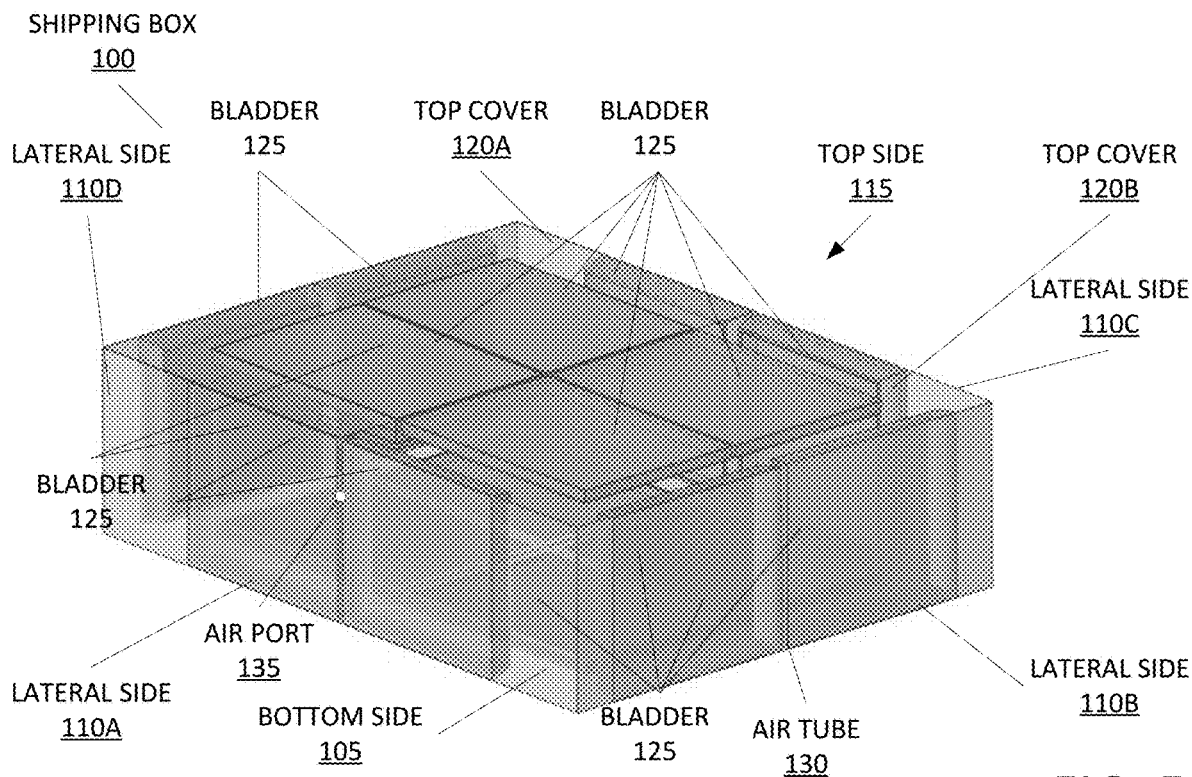
FIG. 5 depicts the closed view of the exemplary shipping box 100 with bladders 125 that are deflated of FIG. 1 shown with a transparency, in accordance with the exemplary embodiments.
Figure 6:
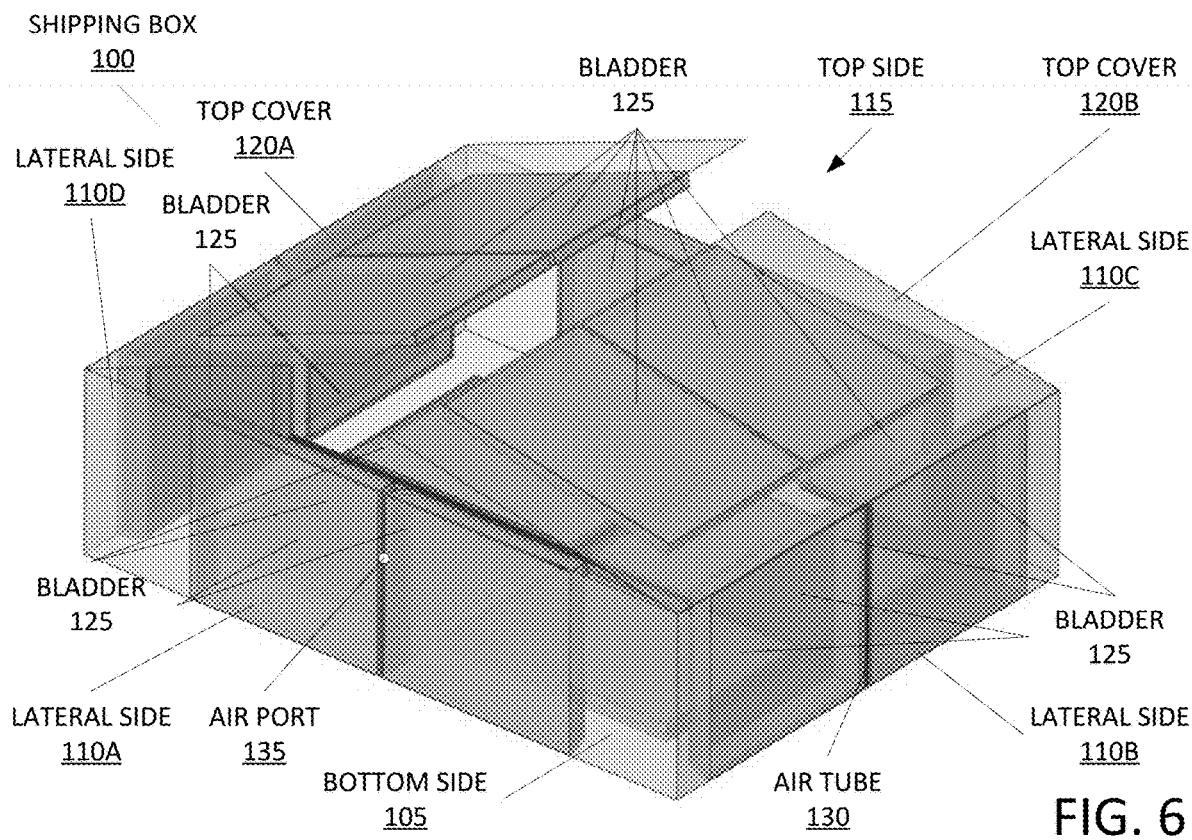
FIG. 6 depicts the open view of the exemplary shipping box 100 with bladders 125 that are deflated of FIG. 2 shown with a transparency, in accordance with the exemplary embodiments.

FIGS. 5-6 depict the exemplary shipping box 100 in which the bladders 125 are deflated and also shown with a transparency, in accordance with the exemplary embodiments. Specifically, FIG. 5 depicts a closed view of the exemplary shipping box 100 and FIG. 6 depicts an open view of the exemplary shipping box 100. FIGS. 5-6 illustrate the bladders 125 in the deflated state and their relative position on each of the interior faces of the bottom side 105, the lateral sides 110A-D, and the top side 115. The transparency of the shipping box 100 is for illustrative purposes to show the relative orientation of the components of the shipping box 100 while the bladders 125 are deflated.

Figure 7:
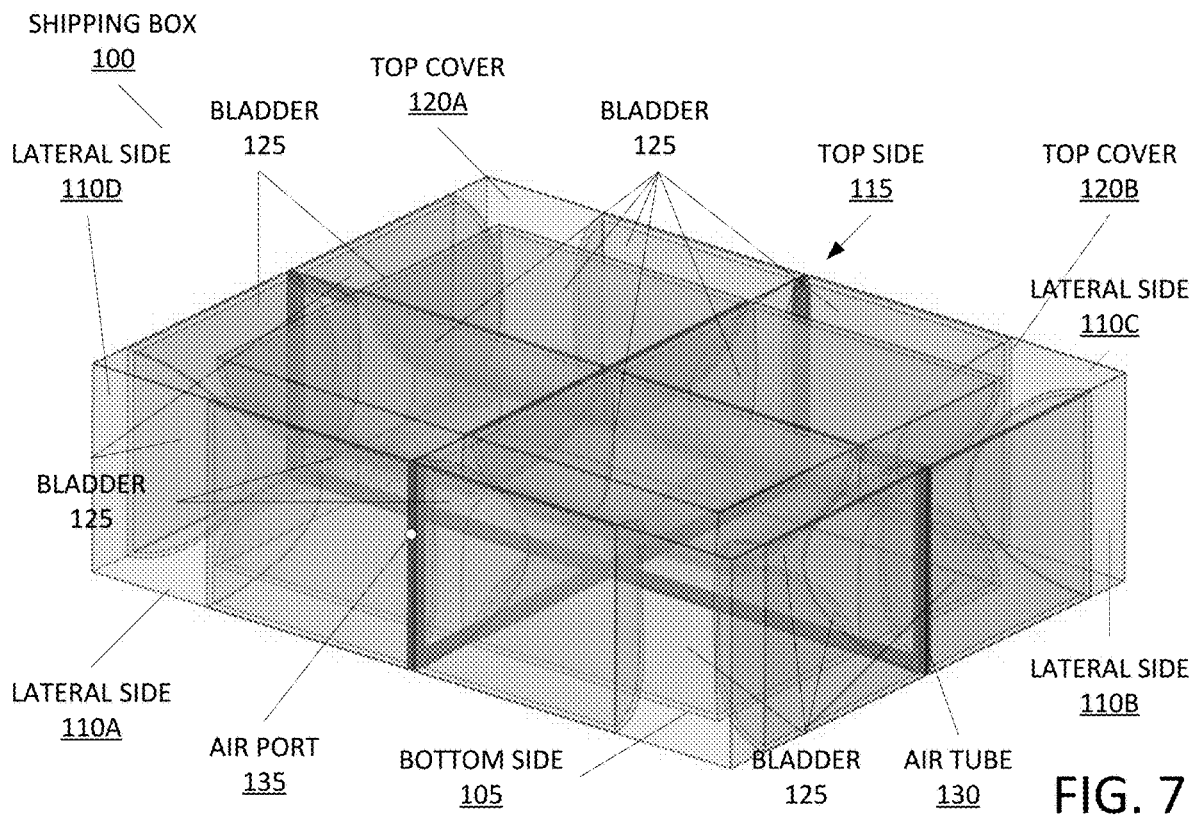
FIG. 7 depicts a closed view of the exemplary shipping box 100 with bladders 125 that are inflated shown with a transparency, in accordance with the exemplary embodiments.
Figure 8:
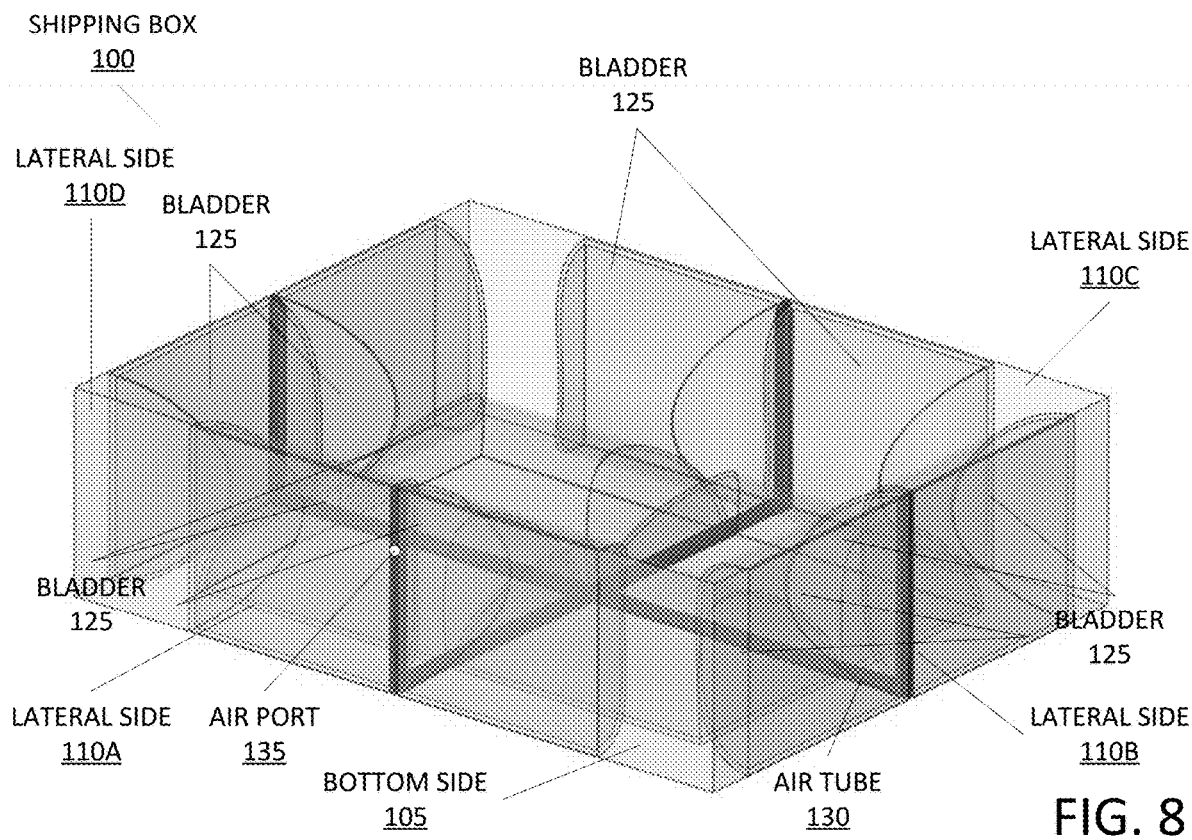
FIG. 8 depicts the interior view of the exemplary shipping box 100 with bladders 125 that are inflated of FIG. 4 shown with a transparency, in accordance with the exemplary embodiments.

FIGS. 7-8 depict the exemplary shipping box 100 in which the bladders 125 are inflated and also shown with a transparency, in accordance with the exemplary embodiments. Specifically, FIG. 7 depicts a closed view of the exemplary shipping box 100 and FIG. 8 depicts an interior view of the exemplary shipping box 100. FIGS. 7-8 illustrate the bladders 125 in the inflated state and their relative position on each of the interior faces of the bottom side 105, the lateral sides 110A-D, and the top side 115. The transparency of the shipping box 100 is for illustrative purposes to show the relative orientation of the components of the shipping box 100 while the bladders 125 are inflated.

FIGS. 5-8 further show additional components of the shipping box 100.

Specifically, FIGS. 5-8 show an air tube 130 and an air port 135. The air tube 130 may provide a conduit in which air is supplied to the bladders 125 in changing the bladders 125 from the deflated state to the inflated state or vice versa. The air port 135 may be a port in which air may be supplied (e.g., to inflate the bladders 125) or drawn (e.g., to deflate the bladders 125). For example, the air port 135 may be configured to receive an air delivery device (e.g., air pump) that supplies the air to the bladders 125. The air delivery device may also be configured to draw air out of the bladders 125 (e.g., vacuum pump). In another example, the air port 135 may be configured to be placed in an open position for air present in the bladders 125 to be drawn out (e.g., a force applied on the bladders 125 may push the air out through the air port 135). It is noted that the use of air is only for illustrative purposes and any fluid may be used in filling the bladders 125.

According to an exemplary embodiment, the air tube 130 may be strategically positioned such that each of the bladders 125 may receive air via the air port 135. As more clearly shown in FIGS. 7-8, the air tube 130 may be a substantially tubular shape positioned and may be considered as different interconnected (e.g., configured to permit fluid flow) portions that are placed between the air pockets of the bladders 125. The positioning of the air tube 130 between the air pockets of the bladders 125 may provide a more efficient delivery of air to the bladders 125. However, this positioning is only illustrative and the air tube 130 may be place in other strategic positions that enable air to be delivered to the bladders 125. As shown in FIG. 8, the air tube 130 is shown with portions each extending from between the air pockets of the bladders 125 on each of the interior faces of the lateral sides 110A-D (e.g., extending from the bottom side 105 to the top side 115), with portions between the bladders 125 on the interior face of the bottom side 105 (e.g., extending from the lateral side 110A to the lateral side 110C), and with portions between both pairs of the air pockets of the bladders 125 on the interior face of the bottom side 105 (e.g., extending from the lateral side 110B to the lateral side 110D). As shown in FIG. 7, the air tube 130 also includes portions extending on the interior face of the top side 105 toward the bladders 125 positioned thereon. Specifically, these portions of the air tube 130 on the top side 105 may extend from the portions of the air tube 130 between the air pockets of the bladders 125 on the interior faces of the lateral side 110B and the lateral side 110D.

The air tube 130 may be positioned relative to the bottom side 105, the lateral sides 110A-D, and the top side 115 in a variety of manners. In an exemplary embodiment, the air tube 130 may be placed within the interior volume of the shipping box 100. For example, the air tube 130 may be placed on the interior face of the bottom side 105, the lateral sides 110A-D, and/or the top side 115 and extend into the interior volume of the shipping box 100. In another exemplary embodiment, the air tube 130 may be incorporated into the bottom side 105, the lateral sides 110A-D, and/or the top side 115. For example, the air tube 130 may be at least partially within the material of the bottom side 105, the lateral sides 110A-D, and/or the top side 115. The air tube 130 may also have select physical attributes. For example, the air tube 130 may be manufactured of a collapsible material to minimize a volume while not in use to deflate or inflate the bladders 125. This may be a particular feature for when the air tube 130 is placed within the interior volume so as to minimize an occupancy of the interior volume of the shipping box 100. In another example, the air tube 130 may be manufactured of a rigid material to maintain a structural integrity. This may be a particular feature for when the air tube 130 is incorporated into the bottom side 105, the lateral sides 110A-D, and/or the top side 115 so as to ensure air flow through the air tube 130, especially while inflating or deflating the bladders 125.

The air port 135 is shown as being located adjacent the portion of the air tube 130 extending between the air pockets on the interior face of the lateral side 110A. However, this positioning is only illustrative. For example, the air port 135 may be placed on any of the lateral sides 110A-D. In another example, the air port 135 may be placed on the bottom side 105 such as at the center of the bottom side 105 where the air tube includes an intersection (e.g., to distribute air to each portion of the air tube 130 concurrently).

As will be described in further detail below, the shipping box 100 illustrated in the exemplary embodiments are not necessarily to scale. The bottom side 105, the lateral sides 110, and the top side 115 of the shipping box 100 may have a variety of different dimensions so that the overall dimensions of the shipping box 100 may vary in a corresponding manner. For example, to accommodate a large interior volume, the shipping box 100 may have relatively large dimensions. In another example, to accommodate a small interior volume, the shipping box 100 may have relatively small dimensions. Furthermore, the bladders 125 illustrated in the exemplary embodiments are also not necessarily to scale. The bladders 125 may occupy a variety of different volumes so that the interior volume of the shipping box 100 may be correspondingly modified through inflation of the bladders 125. In addition, the bladders 125 may be manufactured with a variety of different materials to achieve an intended cushioning mechanism (e.g., rubber, silicone, polymer, etc.). For example, the bladders 125 may be manufactured with a relatively tougher material having a minimum durability to enable reusability of the bladders 125 through a plurality of inflations and deflations. The bladders 125 manufactured with the minimum durability may allow for deformations in the shape of the bladders 125 while inflated when a sufficient force is applied. For example, certain objects may require some space to move within the shipping box 100 while experiencing external forces during transit to prevent damage to the object. Those skilled in the art will understand that the minimum durability may be based on a variety of factors such as the material that is used, an intended minimum number of times that the bladders 125 are to be reused, etc. In another example, the bladders 125 may be manufactured with a material having an increased rigidity such that the modified interior volume from the bladders 125 being inflated is substantially maintained. In this manner, the object may remain in a relatively fixed position within the shipping box 100 even when experiencing external forces. The rigidity may therefore range from one provided by the minimum durability to a relative maximum durability with corresponding degrees of deformations in the bladders 125 being allowed. As will be described in detail below, the size and dimensions of the shipping box 100, the size and dimensions of the bladders 125 in the inflated state, and the material of the bladders 125 may be dynamically selected based on the intended manner in which the packaging is to be performed to ship an object.

Figure 9:
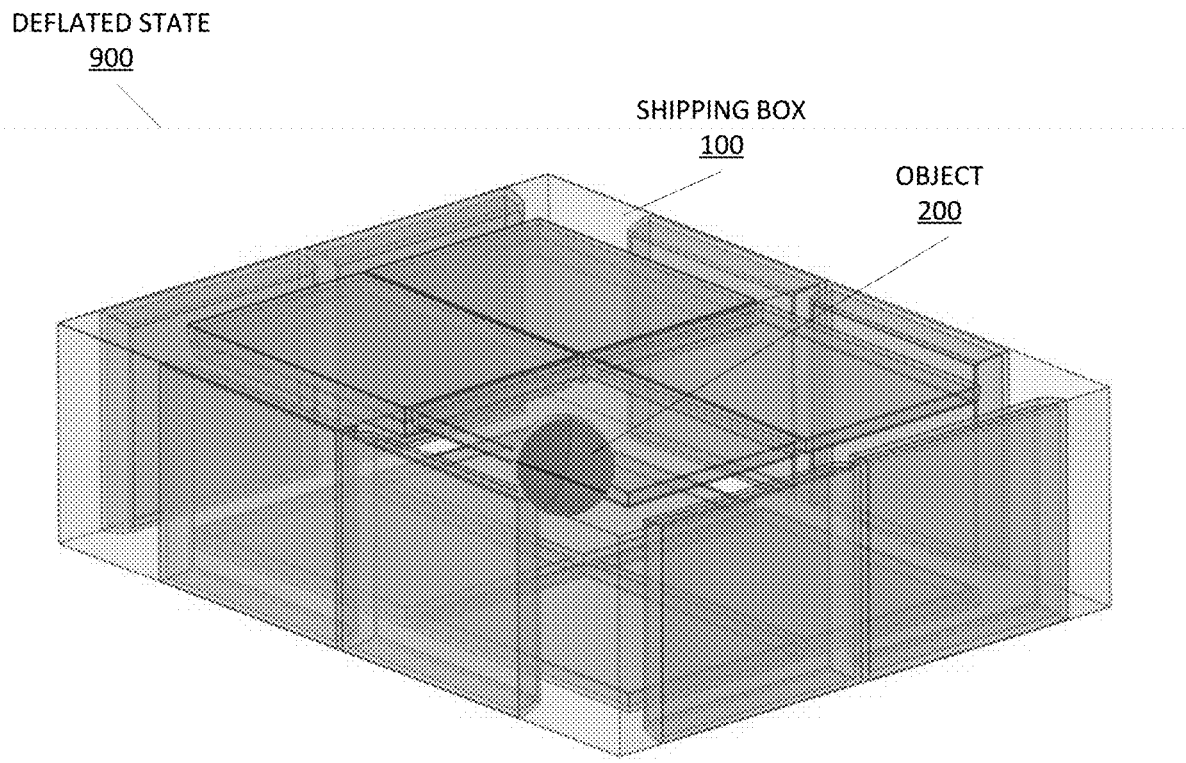
FIG. 9 depicts an exemplary use case of the exemplary shipping box 100 and an object 200 in a deflated state 900, in accordance with the exemplary embodiments.
Figure 10:
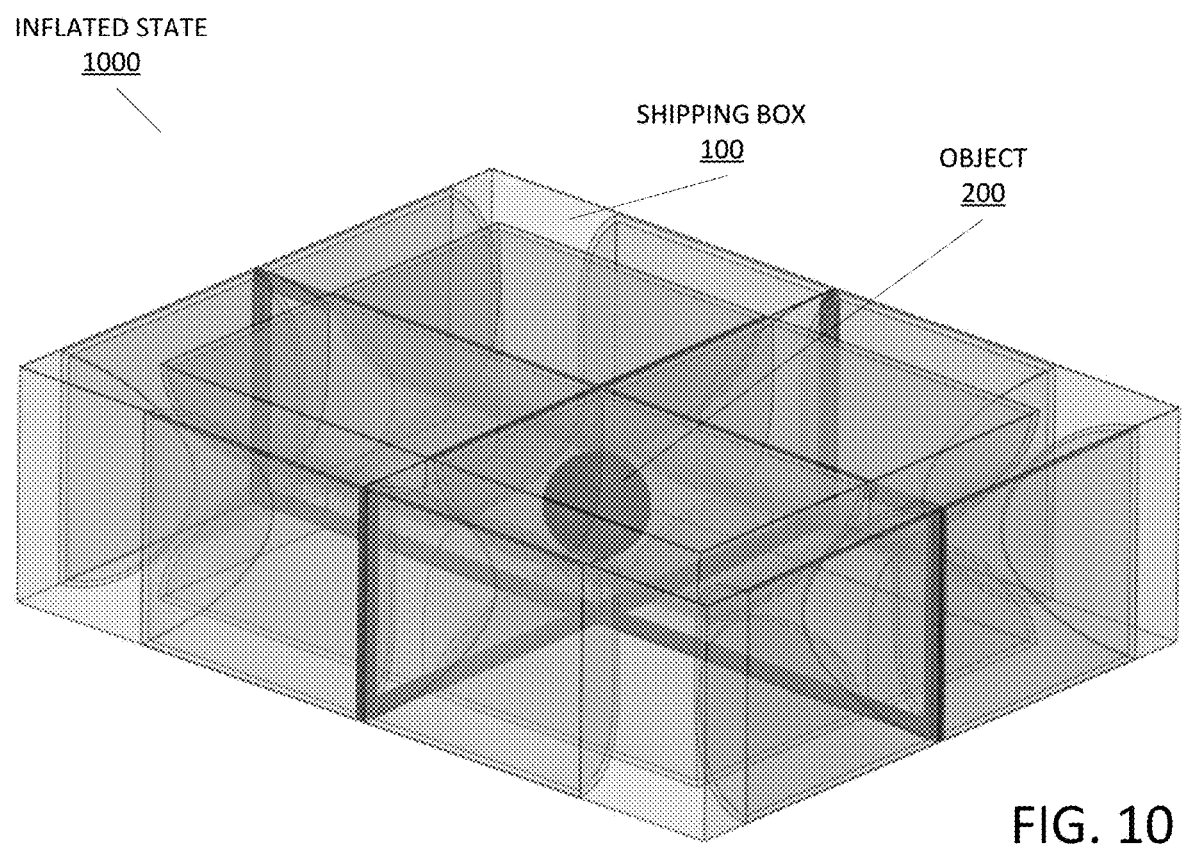
FIG. 10 depicts the exemplary use case of the exemplary shipping box 100 and the object 200 of FIG. 9 in an inflated state 1000, in accordance with the exemplary embodiments.

FIG. 9 depicts an exemplary use case of the exemplary shipping box 100 and an object 200 in a deflated state 900, in accordance with the exemplary embodiments. FIG. 10 depicts the exemplary use case of the exemplary shipping box 100 and the object 200 of FIG. 9 in an inflated state 1000, in accordance with the exemplary embodiments. The deflated state 900 may correspond to the deflated state of the bladders 125 as described above with regard to FIGS. 1, 2, 5, 6. The inflated state 1000 may correspond to the inflated state of the bladders 125 as described above with regard to FIGS. 3, 4, 7, 8.

The use case illustrated in FIGS. 9-10 are directed to the object 200 that is of a relatively small size. In this use case, the shipping box 100 may be selected to have dimensions that accommodate a size of the object 200. For example, the shipping box 100 may have dimensions that are greater than comparable dimensions of the object 200 by a preselected amount (e.g., the shipping box 100 provides an interior volume that is sufficiently larger than the volume of the object 200 such as 25%, the shipping box 100 is shaped and sized to fully fit the object 200 within the interior volume such that the shipping box 100 is capable of being closed/sealed as intended without modification, etc.). Based on a plurality of factors, a packaging process may select parameters (e.g., inflation pressure to be achieved in the bladders 125, an inflation amount, etc.) in which to inflate the bladders 125 such that an intended cushioning mechanism is provided for the packaging of the object 200. The factors may include, for example, the size of the shipping box 100, dimensions of the shipping box 100, the size of the object 200, dimensions of the object 200, placement of the object 200 in the shipping box 100, a material of the bladders 125, an intended range of moveability of the object 200 within the shipping box 100 in the closed or sealed state with the bladders 125 inflated, etc.

Figure 11:
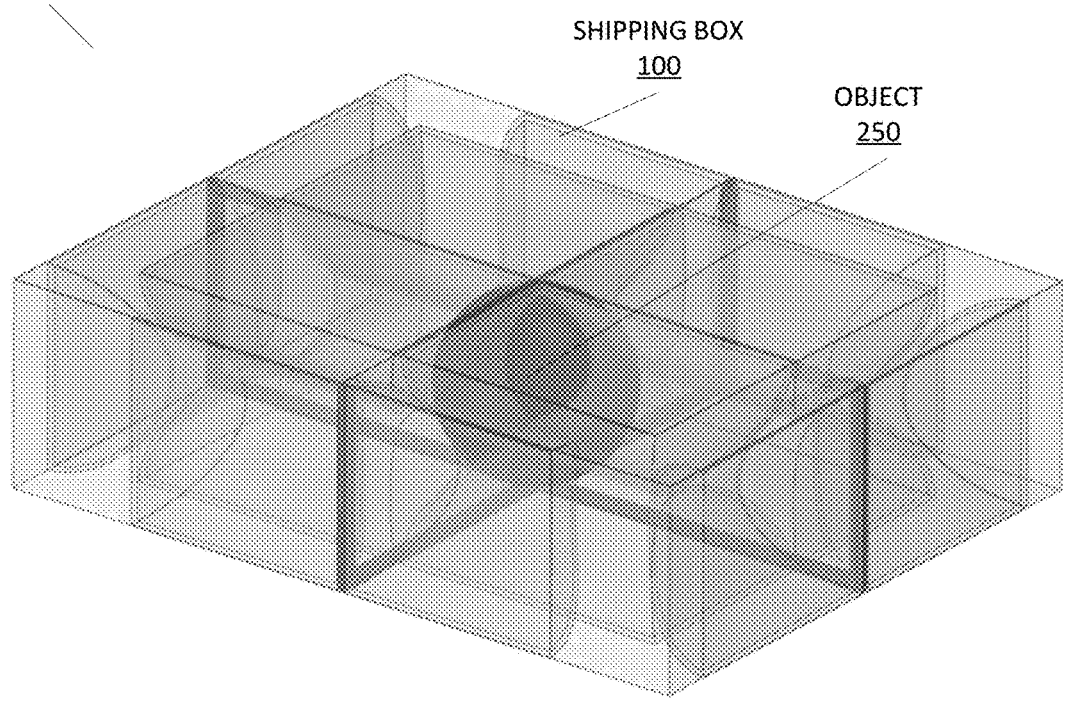
FIG. 11 depicts an exemplary use case of the exemplary shipping box 100 and an object 250 in an inflated state 1100 while closed, in accordance with the exemplary embodiments.
Figure 12:
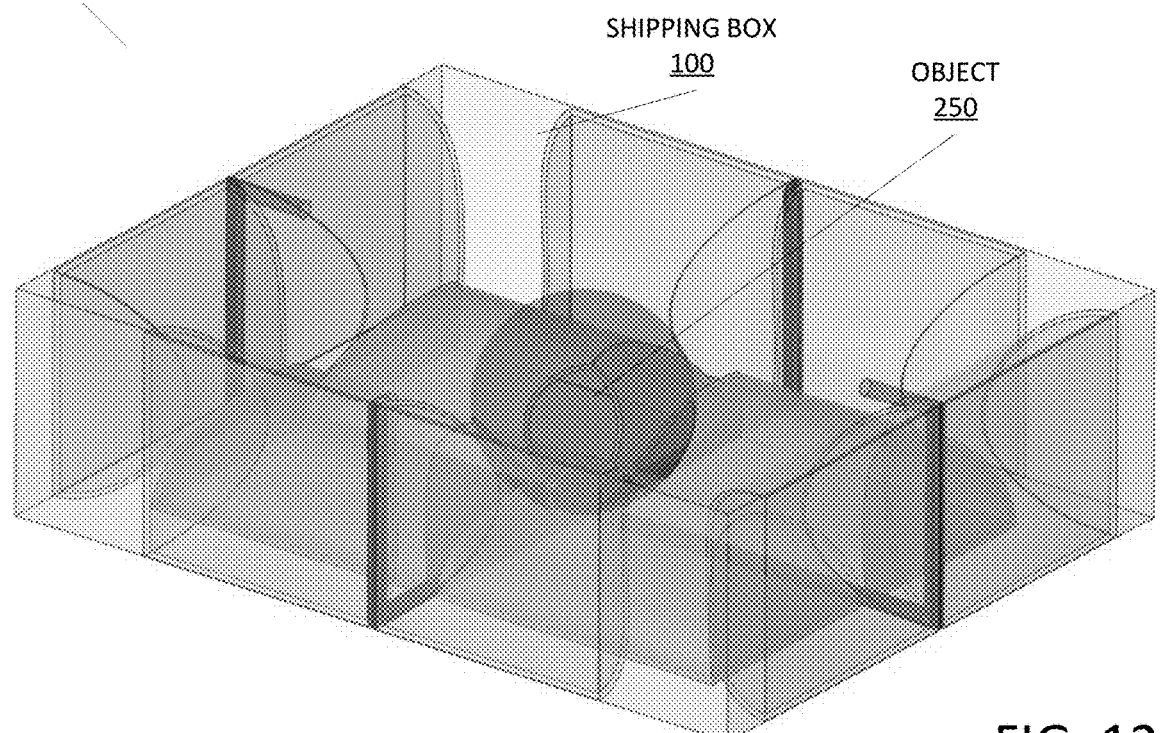
FIG. 12 depicts the exemplary use case of the exemplary shipping box 100 and the object 250 of FIG. 11 in an inflated state 1200 while open, in accordance with the exemplary embodiments.

FIG. 11 depicts an exemplary use case of the exemplary shipping box 100 and an object 250 in an inflated state 1100 while closed, in accordance with the exemplary embodiments. FIG. 12 depicts the exemplary use case of the exemplary shipping box 100 and the object 200 of FIG. 11 in an inflated state 1200 while open, in accordance with the exemplary embodiments. The inflated states 1100, 1200 may correspond to the inflated state of the bladders 125 as described above with regard to FIGS. 3, 4, 7, 8.

The use case illustrated in FIGS. 11-12 are directed to the object 250 that is of a relatively large size. To illustrate an exemplary difference in which to package an object in the shipping box 100, the use case of FIGS. 11-12 may be assumed to utilize a substantially identical version of the shipping box 100 used in the use case of FIGS. 9-10 and the object 250 may be assumed to be a larger version of the object 200 (e.g., share the same physical attributes except for size). However, in view of the object 250 being larger than the object 200, the use case of FIGS. 11-12 may demonstrate an exemplary different manner in which to utilize the bladders 125 for the packaging. In the use case of FIGS. 9-10, the bladders 125 may have been inflated using inflation parameters that accommodate packaging of the object 200. In the use case of FIGS. 11-12, the bladders 125 may have been inflated using different inflation parameters that accommodate packaging of the larger object 250. For example, the bladders 125 of the use case of FIGS. 9-10 may have been inflated with an inflation pressure such that the bladders 125 expand into the interior volume of the shipping box 125 until the bladders 125 contact the object 200. The bladders 125 of the use case of FIGS. 11-12 may have been inflated such that the bladders 125 also expand into the interior volume of the shipping box 125 until the bladders contact the object 200. However, in view of the larger volume of the object 250, the inflation pressure of the use case of FIGS. 11-12 may be less than the inflation pressure of the use case of FIGS. 9-10. In a substantially similar manner, the packaging may be modified in various ways based on the properties of the shipping box 100 and its constituent parts such as the bladders 125. For example, the shipping box 100 may be selected to use the bladders 125 made of a first material to accommodate packaging of an object such that a first inflation pressure is used. A different shipping box 100 may be selected to use the bladders 125 made of a second material to accommodate packaging of the same object such that a second inflation pressure is used. However, the same cushioning features may be realized in both shipping boxes 100 despite the different inflation pressures due to the use of the different materials of the bladders 125.

Figure 13:
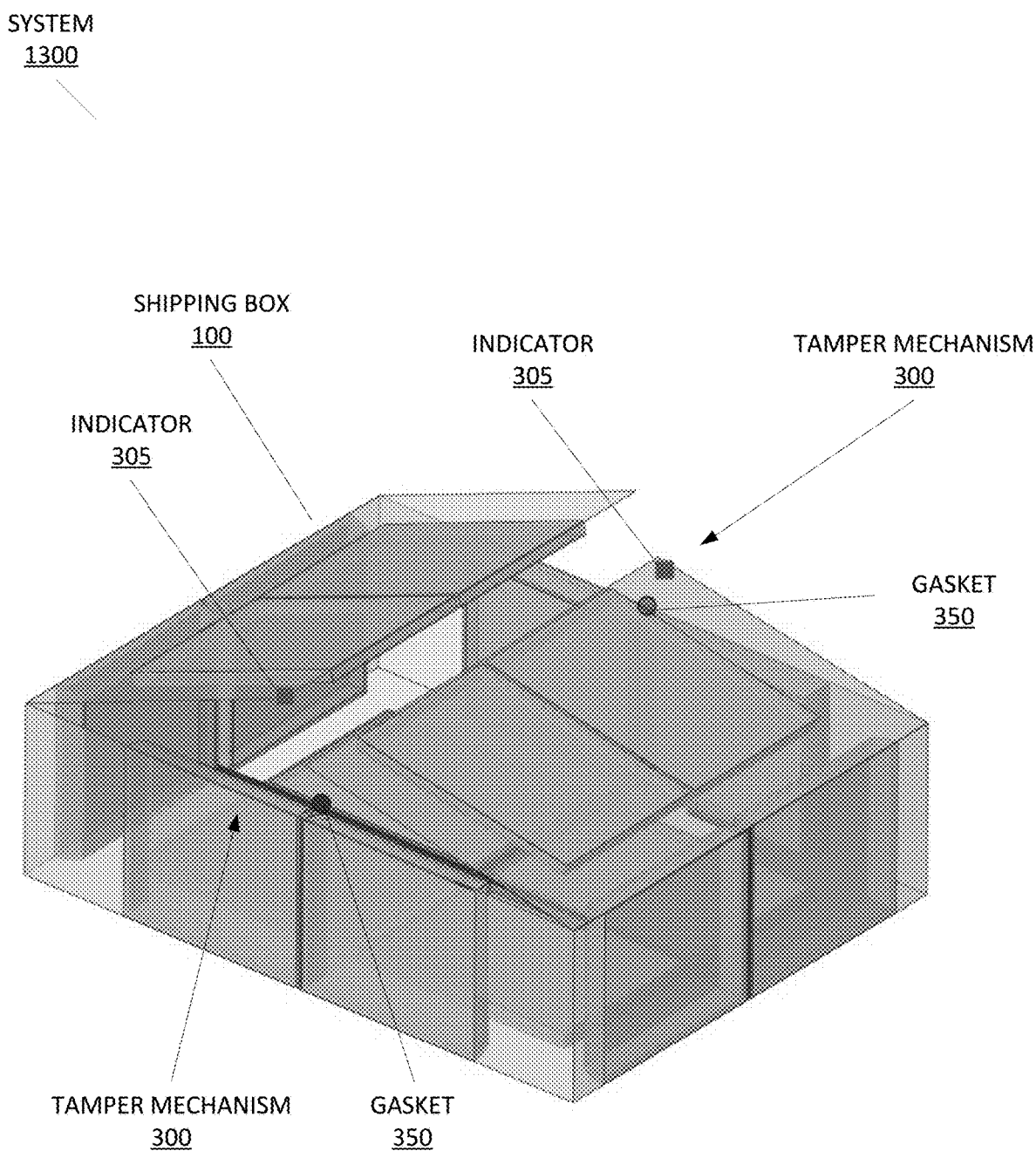
FIG. 13 depicts an exemplary system 1300 of the shipping box 100 and a tamper mechanism 300, in accordance with the exemplary embodiments.

FIG. 13 depicts an exemplary system 1300 of the shipping box 100 and a tamper mechanism 300, in accordance with the exemplary embodiments. The system 1300 illustrates a manner in which to incorporate the tamper mechanism 300 with the shipping box 100. As shown, the tamper mechanism 300 may include an indicator 305 and a gasket 350. The indicator 305 may be disposed on an openable section of the shipping box 100 (e.g., the top cover 120A, 120B) while the gasket 350 may be disposed on an edge of a fixed side of the shipping box 100 (e.g., the lateral sides 110A-D). For example, the system 1300 may incorporate two tamper mechanisms 300 where a first one of the tamper mechanisms 300 includes a first one of the indicators 305 incorporated on the top cover 120A and a first one of the gaskets 350 incorporated on the lateral side 110A and a second one of the tamper mechanisms 300 includes a second one of the indicators 305 incorporated on the top cover 120B and a second one of the gaskets 350 incorporated on the lateral side 110C. One skilled in the art will appreciate a correlation between a number of tamper mechanisms 300 with a number of openable sections of the shipping box 100. For example, as shown, the shipping box 100 includes the top cover 120A and 120B, thereby including the tamper mechanism 300 for each of these openable sections in a 1:1 ratio. If the shipping box 100 were to include further openable sections, the exemplary embodiments may include further tamper mechanisms 300 for each of these further openable sections. However, this ratio is only for illustrative purposes. The shipping box 100 may utilize different ratios. For example, the shipping box 100 may provide increased security from tampering through higher ratios of openable sections to tamper mechanisms 300 (e.g., each openable section includes a plurality of tamper mechanisms 300).

The tamper mechanism 300 may be incorporated in a way to maintain the reusability of the shipping box 100. For example, the indicator 305 may be removably attached to the openable section (e.g., the top cover 120A, 120B) such that a further indicator 305 may be subsequently removably attached. In another example, the shipping box 100 may include a recess in which to receive the gasket 350. The gasket 350 may be removed from the recess such that a further gasket 350 may be subsequently installed in the recess. The indicator 305 and/or the gasket 350 may be incorporated in the shipping box 100 in a more involved manner. For example, the indicator 305 and/or the gasket 350 may seal a fluid pathway used in inflating the bladders 125. Thus, until the tamper mechanism 300 has been installed, the bladders 125 may be incapable of being inflated to an intended inflation pressure as air may escape through the recesses configured to receive the indicator 305 and/or the gasket 350. In a particular exemplary embodiment, the recesses may be disposed on the bladders 125 and/or the air tube 130 at an appropriate location to enable the tamper mechanism 300 to be utilized. Accordingly, the indicator 305 and/or the gasket 350 may plug the recesses, thereby sealing the fluid pathway.

As will be described in further detail below, according to an exemplary embodiment, the indicator 305 may extend a length from the interior face of the openable section (e.g., the top cover 120A, 120B) while the gasket 350 may be flush with the edge of the fixed side (e.g., the lateral sides 110A, 110C). Thus, in a closed or sealed state, the components of the tamper mechanism 300 may couple where the indicator 305 may be received in the gasket 350 which activates the tamper mechanism 300. In another exemplary embodiment, the indicator 305 may be flush with the openable section while the gasket 350 may extend from the edge of the fixed side. In a further exemplary embodiment, the indicator 305 and the gasket 350 may both extend from their respective parts of the shipping box 100. However, in each of these exemplary embodiments, the indicator 305 and the gasket 350 may couple such that the shipping box 100 may be closed or sealed in an intended manner (e.g., as if the tamper mechanism 300 was absent). Once the tamper mechanism 300 has been used (e.g., the shipping box 100 has been opened by the intended recipient), the tamper mechanism 300 may be replaced for a subsequent use of the system 1300 including the shipping box 100 and the tamper mechanism 300.

The indicator 305 may be incorporated in the openable section of the shipping box 100 such that a viewing surface of the indicator 305 (e.g., a top surface) may be exposed or visible. The viewing surface of the indicator 305 may provide a visual indication as to whether the shipping box 100 and/or the tamper mechanism 300 has been tampered prior to an intended opening. Accordingly, for the indicator 305 to be visible even while the shipping box 100 is in a closed or sealed state, in an exemplary embodiment, the top cover 120A, 120B may include a recess in which to receive the indicator 305 in a way for the viewing surface of the indicator 305 to be seen. For example, the recess may extend toward an exterior surface of the top cover 120A, 120B. The indicator 305 may be sized and shaped such that the viewing surface of the indicator 305 extends toward, to, or beyond the exterior surface of the top cover 120A, 120B so long as the viewing surface of the indicator 305 remains visible. In another example, the top cover 120A, 120B may include a transparent window to allow visibility to the viewing surface of the indicator 305. In such an embodiment, the window may extend from an end of the recess (e.g., the recess that receives the indicator 305) toward an exterior surface of the openable section or extend through an entire width of the openable section (e.g., to allow the indicator 305 to be attached to the interior surface of the top cover 120A, 120B via any attachment means such as a mechanical locking mechanism, a magnetic locking mechanism, an adhesive, etc.).

The exemplary embodiments describe various tamper mechanisms 300 that may be incorporated with the shipping box 100 that utilize substantially similar activation and incorporation manners. Specifically, the various tamper mechanisms 300 described herein may be incorporated in the manner described above and activated through coupling of the indicator 305 and the gasket 350 while the activation process may utilize respective features.

Figure 14:
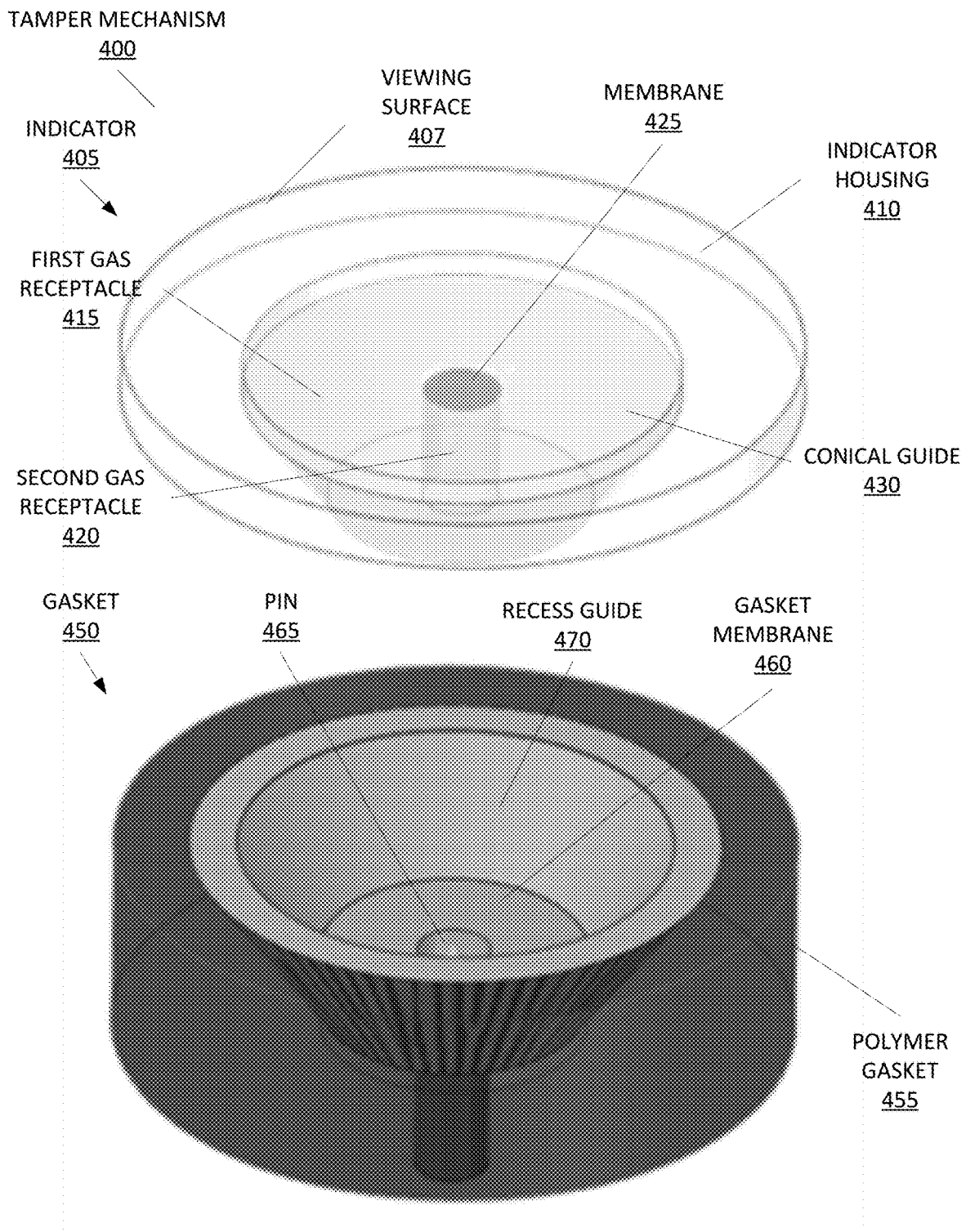
FIG. 14 depicts an exemplary tamper mechanism 400 used with the shipping box 100, in accordance with the exemplary embodiments.

FIG. 14 depicts an exemplary tamper mechanism 400 used with the shipping box 100, in accordance with the exemplary embodiments. The tamper mechanism 400 may represent a version of the tamper mechanism 300 that is replacably incorporated in the shipping box 100. In a manner consistent with the above description of the tamper mechanism 300, the tamper mechanism 400 may include an indicator 405 and a gasket 450 where a coupling therebetween activates the tamper mechanism 400, particularly while the shipping box 100 is in a closed or sealed state. Accordingly, the indicator 405 and the gasket 450 may be an exemplary embodiment of the indicator 305 and the gasket 350, respectively.

The indicator 405 may be a first component of the tamper mechanism 400. The indicator 405 may be removably attached to the openable section of the shipping box 100. For example, the indicator 405 may be sized and shaped to be received in a recess of the openable section of the shipping box 100 (e.g., the top cover 120A, 120B). The openable section of the shipping box 100 and the indicator 405 may be configured such that a viewing surface 407 is visible once the tamper mechanism 400 has been activated such as when the shipping box 100 is in a closed or sealed state. The indicator 405 may include components to enable coupling with the gasket 450 and provide a visual indication of tampering such as an indicator housing 410, a first gas receptacle 415, a second gas receptacle 420, a membrane 425, and a conical guide 430.

The indicator housing 410 may be a housing in which the various components of the indicator 405 may be placed to effectuate the features of the tamper mechanism 400. As illustrated, the indicator housing 410 may include a substantially circular upper section. However, the circular shape is only illustrative and the exemplary embodiments may utilize any shape for the tamper mechanism 400, the indicator 405, and the gasket 450. The upper section of the indicator housing 410 may be transparent such that a visual indication of tampering may be visible. The indicator housing 410 may also include a lower section extending from the upper section. As illustrated, the lower section of the indicator housing 410 may be sized and shaped with the conical guide 430. Thus, the lower section of the indicator housing 410 may be tapered such that a cross sectional size of the lower section decreases as the lower section extends away from the upper section. The conical guide 430 providing a tapered shape may allow proper coupling of the indicator 405 with the gasket 450. For example, the top cover 120A pivots open along the shared edge with the lateral side 110D. Thus, the conical guide 430 may accommodate the pivoting motion of the top cover 120A. However, the conical guide 430 being tapered is only for illustrative purposes and the lower section of the indicator housing 410 may be any shape (e.g., cylindrical).

The lower section of the indicator housing 410 may be substantially hollow for the first gas receptacle 415 and the second gas receptacle 420 to be positioned. As illustrated, the first gas receptacle 415 may be the empty space of the lower section that is filled with a first gas. The second gas receptacle 420 may be a cylindrical container positioned in the first gas receptacle 415 that is filled with a second gas. The second gas receptacle 420 may include a membrane 425 to fluidly separate the first gas from the second gas.

The membrane 425 may be subsequently punctured to activate the tamper mechanism 400 where the activation entails the first gas reacting with the second gas to create a visual indication that the tamper mechanism 400 has been activated. For example, the first gas may be oxygen (e.g., $O2$) which is a colorless gas. The second gas may be nitric oxide (e.g., NO) which is also a colorless gas. Thus, while the first and second gases are separated from one another via the membrane 425, there may be an absence of color. Once the tamper mechanism 400 has been activated through puncturing of the membrane 425, the oxygen and the nitric oxide may react to form nitrogen dioxide (e.g., $NO_2$). The properties of nitrogen dioxide include being a gas with a reddish-brown color when the temperature is above 21.2° C. and being a liquid with a yellowish-brown color when the temperature is below 21.2° C. The gases and the reaction may be selected based on a variety of factors including expected temperature ranges that the tamper mechanism 400 will be exposed during transit (e.g., after closing and/or sealing the shipping box 100 until completed delivery). Accordingly, the use of oxygen, nitric oxide, and the reaction to form nitrogen dioxide is only for illustrative purposes. The exemplary embodiments may utilize any combination of substances that react (e.g., spontaneous reaction) and include a visual change as a result. For example, the exemplary embodiments may include a combination of liquids, gases, coatings, etc.

The gasket 450 may be a second component of the tamper mechanism 400. The gasket 450 may be removably attached to the fixed side of the shipping box 100. For example, the gasket 450 may be sized and shaped to be received in a recess of one of the fixed sides of the shipping box 100 (e.g., the lateral side 110A, 110C). The fixed side of the shipping box 100 and the gasket 450 may be configured to correspond to a position of the indicator 405 on the openable section (e.g., the top cover 120A, 120B) such that the indicator 405 may be coupled with the gasket 450. The gasket 450 may include components that enable coupling with the indicator 405 and provide a visual indication of tampering such as a polymer gasket 455, a gasket membrane 460, a pin 465, and a recess guide 470.

The polymer gasket 455 may provide a housing in which the various components of the gasket 450 may be placed to effectuate the features of the tamper mechanism 400. As illustrated, the polymer gasket 455 may have a substantially cylindrical shape.

However, in a manner similar to the indicator 405, the cylindrical shape is only illustrative and the exemplary embodiments may utilize any shape for the tamper mechanism 400, the indicator 405, and the gasket 450. The polymer gasket 455 may be sized and shaped to be received in the recess of the fixed side. As described above, the recess in the fixed side that receives the gasket 450 may be in fluid communication with the bladders 125 and/or the air tube 130 of the shipping box 100. As will be described below, the fluid communication may allow for a single operation (e.g., inflating the bladders 125) to also activate the tamper mechanism 400. The polymer gasket 455 may therefore be received in the recess of the fixed side in a sealed manner to create an air tight pocket.

Within the polymer gasket 455, the gasket 450 may include the recess guide 470. The recess guide 470 may be a conical guide that corresponds to the conical guide 430 of the indicator 405. For example, the recess guide 470 may taper from a top side (e.g., an exposed end) to a bottom side (e.g., an end received in the recess of the fixed side). The bottom side of the recess guide 470 may be the gasket membrane 460. The gasket membrane 460 may be configured to expand toward the top side. Within the gasket membrane 460, the gasket 450 may include the pin 465. The pin 465 may be tied to the gasket membrane 460. The pin 465 may also move and be configured to puncture the membrane 425.

Figure 15:
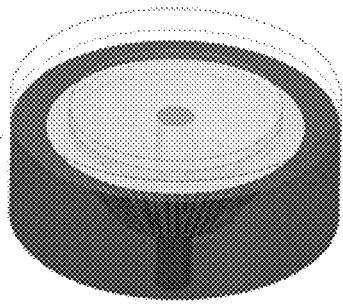
FIG. 15 depicts exemplary tamper mechanism states 1500 of the exemplary tamper mechanism 400, in accordance with the exemplary embodiments.
Figure 15:
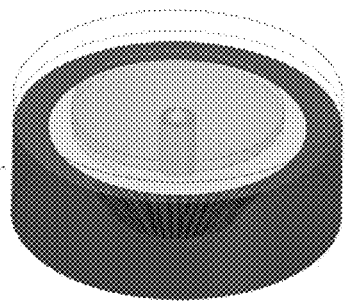
Figure 15:
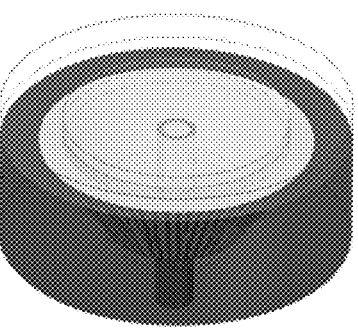

FIG. 15 depicts exemplary tamper mechanism states 1500 of the exemplary tamper mechanism 400, in accordance with the exemplary embodiments. The tamper mechanism states 1500 are directed to when the tamper mechanism 400 has been assembled or when the indicator 405 has been coupled with the gasket 450. For example, the top cover 120A may be closed by pivoting downward toward the lateral side 110A such that the conical guide 430 is received in the recess guide 470. When coupled, a bottom side of the upper section of the indicator housing 410 may be adjacent a top side of the polymer gasket 455. In addition, when coupled, the bottom side of the lower section of the indicator housing 410 may be adjacent the gasket membrane 460. Furthermore, when coupled, the second gas receptacle 420 may be vertically aligned with an axis of movement of the pin 465. The tamper mechanism states 1500 may include an unpressurized state 1505 (e.g., when the tamper mechanism 400 is assembled but prior to inflation of the bladders 125), a pressurized state 1510 (e.g., when the tamper mechanism 400 is assembled after inflation of the bladders 125), and a tampered state 1515 (e.g., when the tamper mechanism 400 is assembled, after inflation of the bladders 125, and after tampering of the tamper mechanism 400 and/or the shipping box 100).

Once the indicator 405 and the gasket 450 have been coupled, the tamper mechanism 400 may be in the unpressurized state 1505 and prepared for activation. In the unpressurized state 1505, the membrane 425 may be intact and the first gas and the second gas in the first gas receptacle 415 and the second gas receptacle 420, respectively, may remain separated. In this manner, the indicator 405 may remain substantially colorless. The membrane 425 may also be designed with a color so that a visual inspection may indicate whether the membrane 425 is intact or has been punctured.

As described above, the tamper mechanism 400 may be activated through the same operation used in inflating the bladders 125 and preparing the shipping box 100. With the gasket 450 being in fluid communication with the bladders 125 and/or the air tube 130, the inflation of the bladders 125 may result in the inflation pressure to be exerted on the gasket 450. Specifically, the inflation pressure may be exerted on the gasket membrane 460 which causes the gasket membrane 460 to expand toward the top side of the gasket 450. The expansion of the gasket membrane 460 also results in the pin 465 to be pushed upward. Therefore, the pin 465 may be pushed upward into the second gas receptacle 420. The pin 465 may continue to move upward with increased inflation pressure being exerted on the gasket membrane 460 until the pin 465 punctures the membrane 425. Once the membrane 425 is punctured, the first gas in the first gas receptacle 415 and the second gas in the second gas receptacle 420 may react to create the visual indication that is visible through the viewing surface 407 of the indicator housing 405. In this manner, the tamper mechanism 400 may be in the pressurized state 1510. As illustrated, the remaining portion of the membrane 425 is visible with the color of the membrane 425 providing a visual signal that the membrane 425 is no longer intact. The first gas receptacle 415 is also shown with a change in color due to the reaction of the first and second gases. Thus, the third gas formed from the reaction is present in the first gas receptacle 415.

Once activated, the tamper mechanism 400 may provide the visual indication of whether the tamper mechanism 400 and/or the shipping box 100 has been tampered. For example, the shipping box 100 may have been inadvertently opened or intercepted by an unintended recipient who opened the shipping box 100. When such an event occurs involving tampering, the tamper mechanism 400 may change from the pressurized state 1510 to the tampered state 1515. In the tampered state 1515, the membrane 425 may remain punctured (e.g., with only the remaining portion at the top end of the second gas receptacle 420). However, the third gas created from the reaction of the first and second gases may escape due to the indicator 405 being separated from the gasket 450 (e.g., the top cover 120A may be lifted since all other sides are fixed and pivoted out which disassembles the tamper mechanism 400 where the pin 465 is removed from the second gas receptacle 420 which creates a fluid communication with the outside through which the third gas may escape). Therefore, the first gas receptacle 415 may be empty. While empty, the visual signal (e.g., visible color) that the third gas provides may also be absent which provides the visual indication (e.g., no color) that the tamper mechanism 400 is in the tampered state 1515. It is noted that opening the shipping box 100 by the intended recipient also places the tamper mechanism 400 in the tampered state 1515.

Figure 16:
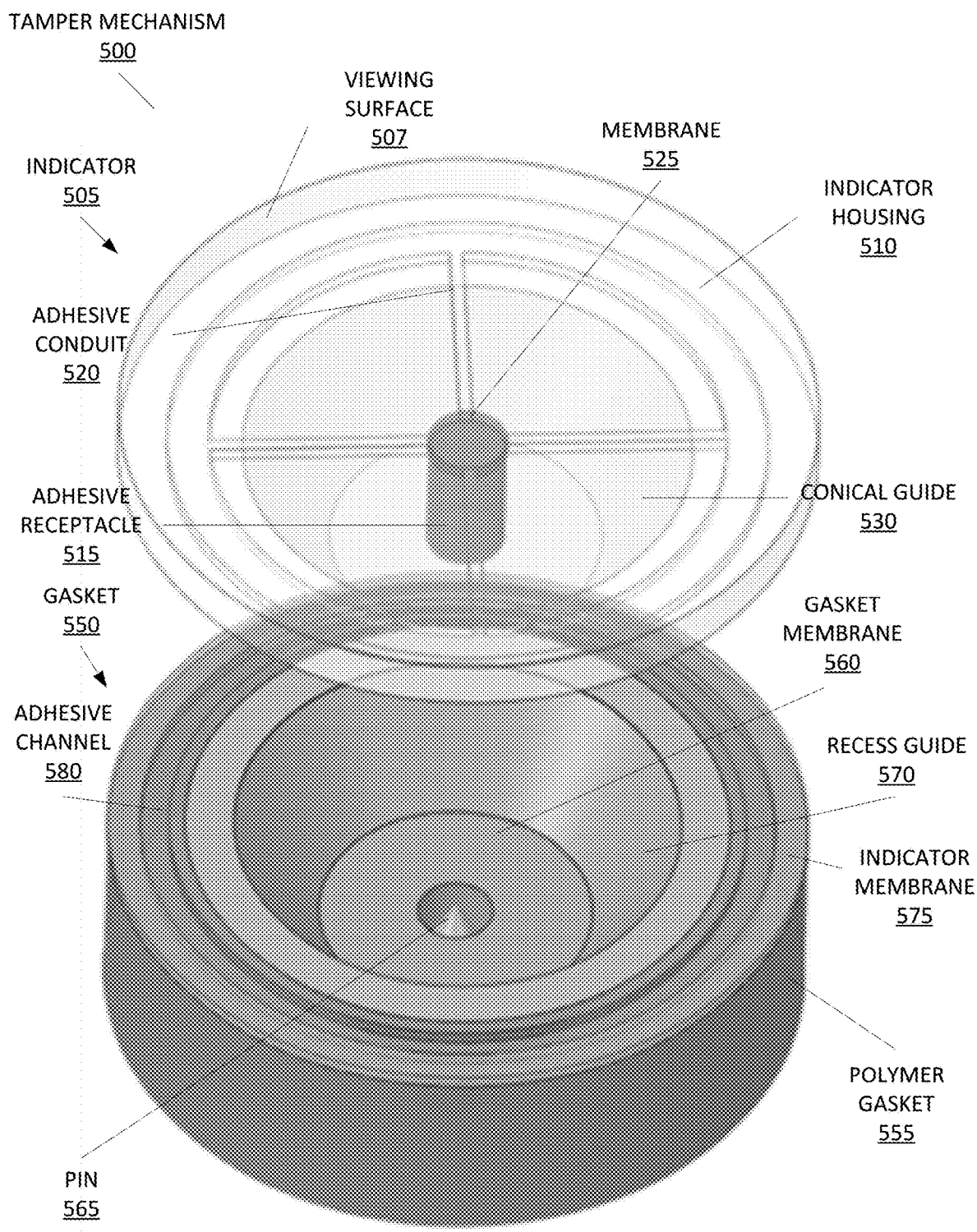
FIG. 16 depicts an exemplary tamper mechanism 500 used with the shipping box 100, in accordance with the exemplary embodiments.

FIG. 16 depicts an exemplary tamper mechanism 500 used with the shipping box 100, in accordance with the exemplary embodiments. The tamper mechanism 500 may represent a version of the tamper mechanism 300 that is replacably incorporated in the shipping box 100. In a manner consistent with the above description of the tamper mechanism 300, the tamper mechanism 500 may include an indicator 505 and a gasket 550 where a coupling therebetween activates the tamper mechanism 500, particularly while the shipping box 100 is in a closed or sealed state. Accordingly, the indicator 505 and the gasket 550 may be an exemplary embodiment of the indicator 305 and the gasket 350, respectively.

The indicator 505 may be a first component of the tamper mechanism 500. The indicator 505 may be removably attached to the openable section of the shipping box 100. For example, the indicator 505 may be sized and shaped to be received in a recess of the openable section of the shipping box 100 (e.g., the top cover 120A, 120B). The openable section of the shipping box 100 and the indicator 505 may be configured such that a viewing surface 507 is visible once the tamper mechanism 500 has been activated such as when the shipping box 100 is in a closed or sealed state. The indicator 505 may include components to enable coupling with the gasket 550 and provide a visual indication of tampering such as an indicator housing 510, an adhesive receptacle 515, an adhesive conduit 520, a membrane 525, and a conical guide 530.

The indicator housing 510 may be a housing in which the various components of the indicator 505 may be placed to effectuate the features of the tamper mechanism 500. As illustrated, the indicator housing 510 may include a substantially circular upper section. However, the circular shape is only illustrative and the exemplary embodiments may utilize any shape for the tamper mechanism 500, the indicator 505, and the gasket 550. The upper section of the indicator housing 510 may be transparent such that a visual indication of tampering may be visible. The indicator housing 510 may also include a lower section extending from the upper section. As illustrated, the lower section of the indicator housing 510 may be sized and shaped with the conical guide 530. Thus, the lower section of the indicator housing 510 may be tapered such that a cross sectional size of the lower section decreases as the lower section extends away from the upper section. The conical guide 530 providing a tapered shape may allow proper coupling of the indicator 505 with the gasket 550. For example, the top cover 120A pivots open along the shared edge with the lateral side 110D. Thus, the conical guide 530 may accommodate the pivoting motion of the top cover 120A. However, the conical guide 530 being tapered is only for illustrative purposes and the lower section of the indicator housing 510 may be any shape (e.g., cylindrical).

The lower section of the indicator housing 510 may be configured to house the adhesive receptacle 515. As illustrated, the adhesive receptacle 515 may be a cylindrical container positioned in the lower section of the indicator housing 510 that is filled with an adhesive. The adhesive receptacle 515 may include a membrane 525 to contain the adhesive within the adhesive receptacle 515 until a time the adhesive is to be used.

The membrane 525 may be subsequently punctured to activate the tamper mechanism 500 where the activation entails the adhesive to flow into the adhesive conduit 520 that bonds to a component of the gasket 550. The adhesive conduit 520 may be in fluid communication with the adhesive receptacle 515. The adhesive conduit 520 may be fluid communication pathways (e.g., a pipe) that receive the adhesive and direct the adhesive to the component of the gasket 550. The adhesive conduit 520 is illustrated as including four fluid communication pathways equally spaced apart from one another (e.g., spaced 90° apart from adjacent fluid communication pathways). As will be described in further detail below, a single operation used in inflating the bladders 125 of the shipping box 100 may also actuate the tamper mechanism 500 in being activated through puncturing of the membrane 525 and inflation pressure pushing the adhesive out of the adhesive receptacle 515, through the adhesive conduit 520, and bonding to the component of the gasket 550.

The gasket 550 may be a second component of the tamper mechanism 500. The gasket 550 may be removably attached to the fixed side of the shipping box 100. For example, the gasket 550 may be sized and shaped to be received in a recess of one of the fixed sides of the shipping box 100 (e.g., the lateral side 110A, 110C). The fixed side of the shipping box 100 and the gasket 550 may be configured to correspond to a position of the indicator 505 on the openable section (e.g., the top cover 120A, 120B) such that the indicator 505 may be coupled with the gasket 550. The gasket 550 may include components that enable coupling with the indicator 505 and provide a visual indication of tampering such as a polymer gasket 555, a gasket membrane 560, a pin 565, a recess guide 570, an indicator membrane 575, and an adhesive channel 580.

The polymer gasket 555 may provide a housing in which the various components of the gasket 550 may be placed to effectuate the features of the tamper mechanism 500. As illustrated, the polymer gasket 555 may have a substantially cylindrical shape. However, in a manner similar to the indicator 505, the cylindrical shape is only illustrative and the exemplary embodiments may utilize any shape for the tamper mechanism 500, the indicator 505, and the gasket 550. The polymer gasket 555 may be sized and shaped to be received in the recess of the fixed side. As described above, the recess in the fixed side that receives the gasket 550 may be in fluid communication with the bladders 125 and/or the air tube 130 of the shipping box 100. As will be described below, the fluid communication may allow for a single operation (e.g., inflating the bladders 125) to also activate the tamper mechanism 500. The polymer gasket 555 may therefore be received in the recess of the fixed side in a sealed manner to create an air tight pocket.

Within the polymer gasket 555, the gasket 550 may include the recess guide 570. The recess guide 570 may be a conical guide that corresponds to the conical guide 530 of the indicator 505. For example, the recess guide 570 may taper from a top side (e.g., an exposed end) to a bottom side (e.g., an end received in the recess of the fixed side). The bottom side of the recess guide 570 may be the gasket membrane 560. The gasket membrane 560 may be configured to expand toward the top side. Within the gasket membrane 560, the gasket 550 may include the pin 565. The pin 565 may be tied to the gasket membrane 560. The pin 565 may also move and be configured to puncture the membrane 525.

The indicator membrane 575 may be the component of the gasket 550 that is configured to bond with the adhesive that is applied via the adhesive conduits 520. The adhesive may be applied to the indicator membrane 575 via the adhesive channel 580. The adhesive channel 580 may be a fluid communication pathway extending from the adhesive conduit 520. Thus, adhesive may be pushed out of the adhesive receptacle 515, into the adhesive conduit 520, and onto the indicator membrane 575 via the adhesive channel 580. As illustrated, in an exemplary embodiment, the indicator membrane 575 may be a continuous, outer ring positioned on a top surface of the polymer gasket 555 (e.g., at a periphery of the top side of the polymer gasket 555). The adhesive channel 580 may be a ring-shaped fluid communication pathway adjacent the indicator membrane 575 and the adhesive conduit 520 and positioned therebetween (e.g., in the coupled or assembled state of the tamper mechanism 500). When the adhesive has been applied, the indicator membrane 575 may be bonded to an under side of the upper section of the indicator housing 510. In this manner, the adhesive may form a fixed seal between the indicator 505 and the gasket 550 with the indicator membrane 575 disposed therebetween. The indicator membrane 575 may also be designed to be less durable than the material of the indicator housing 510 such that separation of the indicator 505 from the gasket 550 may result in the indicator membrane 575 being damaged, broken, or discontinuous. Any visible damage such as being broken or being discontinuous to the indicator membrane 575 may be indicative of the tamper mechanism 500 and/or the shipping box 100 being tampered.

Figure 17:
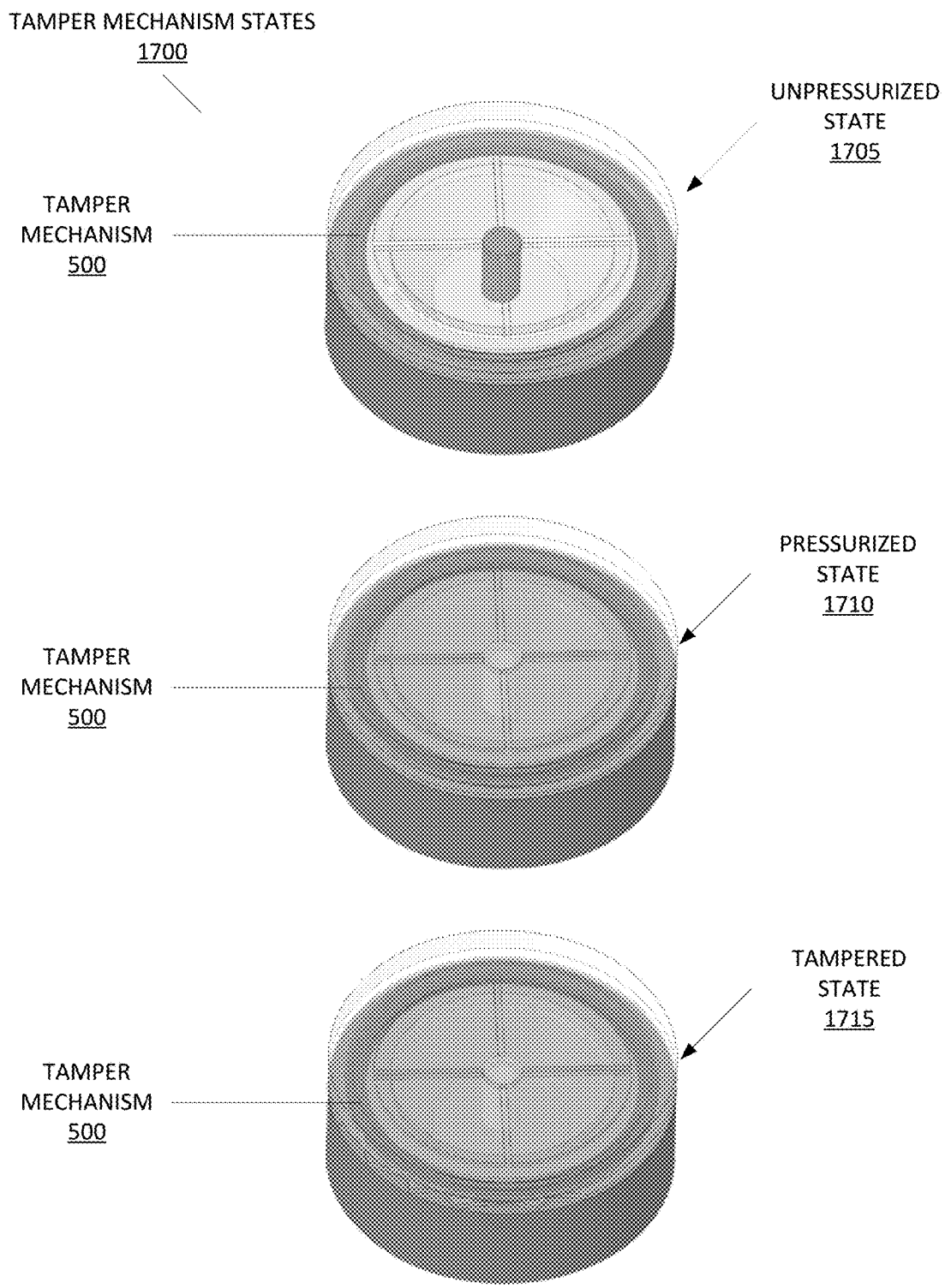
FIG. 17 depicts exemplary tamper mechanism states 1700 of the exemplary tamper mechanism 500, in accordance with the exemplary embodiments.

FIG. 17 depicts exemplary tamper mechanism states 1700 of the exemplary tamper mechanism 500, in accordance with the exemplary embodiments. The tamper mechanism states 1700 are directed to when the tamper mechanism 500 has been assembled or when the indicator 505 has been coupled with the gasket 550. For example, the top cover 120A may be closed by pivoting downward toward the lateral side 110A such that the conical guide 530 is received in the recess guide 570. When coupled, a bottom side of the upper section of the indicator housing 510 may be adjacent a top side of the polymer gasket 555. In addition, when coupled, the bottom side of the lower section of the indicator housing 510 may be adjacent the gasket membrane 560. Furthermore, when coupled, the adhesive receptacle 515 may be vertically aligned with an axis of movement of the pin 565. The tamper mechanism states 1700 may include an unpressurized state 1705 (e.g., when the tamper mechanism 500 is assembled but prior to inflation of the bladders 125), a pressurized state 1710 (e.g., when the tamper mechanism 500 is assembled after inflation of the bladders 125), and a tampered state 1715 (e.g., when the tamper mechanism 500 is assembled, after inflation of the bladders 125, and after tampering of the tamper mechanism 500 and/or the shipping box 100).

Once the indicator 505 and the gasket 550 have been coupled, the tamper mechanism 500 may be in the unpressurized state 1505 and prepared for activation. In the unpressurized state 1505, the membrane 525 may be intact and the adhesive may reside in the adhesive receptacle 515. In a manner substantially similar to the tamper mechanism 400, the indicator 505 may remain substantially colorless. The membrane 525 may also be designed with a color so that a visual inspection may indicate whether the membrane 525 is intact or has been punctured.

As described above, the tamper mechanism 500 may be activated through the same operation used in inflating the bladders 125 and preparing the shipping box 100. With the gasket 550 being in fluid communication with the bladders 125 and/or the air tube 130, the inflation of the bladders 125 may result in the inflation pressure to be exerted on the gasket 550. Specifically, the inflation pressure may be exerted on the gasket membrane 560 which causes the gasket membrane 560 to expand toward the top side of the gasket 550. The expansion of the gasket membrane 560 also results in the pin 565 to be pushed upward. Therefore, the pin 565 may be pushed upward into the adhesive receptacle 515. The pin 565 may continue to move upward with increased inflation pressure being exerted on the gasket membrane 560 until the pin 565 punctures the membrane 525. Once the membrane 525 is punctured, the inflation pressure may also push the adhesive out of the adhesive receptacle 515 and into the adhesive conduit 515. The adhesive may further be pushed into the adhesive channel 580 and bond with the indicator membrane 575 which may also be bonded to the indicator housing 510. In this manner, the tamper mechanism 500 may be in the pressurized state 1510. As illustrated, the remaining portion of the membrane 525 is visible with the color of the membrane 525 providing a visual signal that the membrane 525 is no longer intact. The adhesive may be provided with a color to indicate when the tamper mechanism 500 is in the pressurized state 1510. In an exemplary embodiment, the adhesive conduit 520 may also allow the adhesive to disperse across an area corresponding to the viewing surface 507 such that the visual indication that the tamper mechanism 500 has been activated is readily visible.

Once activated, the tamper mechanism 500 may provide the visual indication of whether the tamper mechanism 500 and/or the shipping box 100 has been tampered. For example, the shipping box 100 may have been inadvertently opened or intercepted by an unintended recipient who opened the shipping box 100. When such an event occurs involving tampering, the tamper mechanism 500 may change from the pressurized state 1510 to the tampered state 1515. In the tampered state 1515, the membrane 525 may remain punctured (e.g., with only the remaining portion at the top end of the adhesive receptacle 515). However, the tampering may have caused the indicator 505 to separate from the gasket 550 resulting in the indicator membrane 575 to be broken or discontinuous (e.g., the top cover 120A may be lifted since all other sides are fixed and pivoted out which disassembles the tamper mechanism 500 where the indicator membrane 575 provides a least resistance in breaking due to the separation of the bonded surfaces). The breaking of the indicator membrane 575 may be the visual signal (e.g., visible breakage) that tampering has occurred where the tamper mechanism 500 is in the tampered state 1515. It is noted that opening the shipping box 100 by the intended recipient also places the tamper mechanism 500 in the tampered state 1515.

The tamper mechanism 500 using adhesive to provide the visual indication may provide an additional feature. After closing the shipping box 100, the shipping box 100 may be sealed using, for example, packing tape that is placed over the top cover 120A, 120B (e.g., when the free edges are adjacent when pivoted close). The tamper mechanism 500 may allow for the packing tape to be omitted in sealing the shipping box 100 as the adhesive may ensure that the top cover 120A, 120B may remain in a pivoted close position.

As described above, the tamper mechanisms 400, 500 are both configured to be used in a replacable manner. The tamper mechanisms 400, 500 may therefore be one-use devices that are incorporated in the shipping box 100. Once the tamper mechanism 400, 500 have entered the tampered state 1515, 1715, respectively, another use of the shipping box 100 requires a new one of the tamper mechanism 400, 500 to be installed. Thus, the indicator 405 and the gasket 450 of the tamper mechanism 400 or the indicator 505 and the gasket 550 of the tamper mechanism 500 may be replaced with fresh versions of these components prior to closing or sealing of the shipping box 100.

The system 1300 described above relates to using one of the tamper mechanisms 400, 500 with the shipping box 100. When using the tamper mechanism 400, the reaction of fluids may provide the basis in which to create the visual indication of the tamper mechanism states 1500, particularly with regard to whether the tamper mechanism 400 is in the pressurized state 1510 where the third gas was created or in the tampered state 1515 where the third gas has escaped. When using the tamper mechanism 500, the adhesive bonding to the indicator membrane 575 may provide the basis in which to create the visual indication of the tamper mechanisms states 1700, particularly with regard to whether the tamper mechanism 500 is in the pressurized state 1710 where absence of tampering or opening keeps the indicator membrane 575 intact or in the tampered state 1715 where the presence of tampering or opening creates a breakage in the indicator membrane 575. In a further exemplary embodiment, the tamper mechanism 300 may be a combination of the tamper mechanism 400 and the tamper mechanism 500. For example, in a shipping box 100 where increased security measures may be required, a more advanced type of the tamper mechanism 300 may be utilized. The tamper mechanism 300 may therefore incorporate features of both the tamper mechanism 400 and the tamper mechanism 500. For example, the second gas receptacle 420 may be modified to also include the adhesive receptacle 515 to accommodate the second gas and the adhesive. In this manner, the visual indications provided via the third gas and the indicator membrane 575 may both be present.

The shipping box 100 may be configured with a plurality of further features. For example, the shipping box 100 may be reusable packaging for a vendor that continuously packages objects for delivery. Accordingly, the vendor may wish to have the reusable shipping box 100 returned for a further packaging. To accommodate this scenario as well as any other scenario in which the shipping box 100 is to be reused, the shipping box 100 may include a variety of features that facilitate reuse of the shipping box 100. For example, the shipping box 100 may include a feature in which the bladders 125 automatically deflate from opening one or both of the top covers 120A, 120B. As described above, the bladders 125 and/or the air tube 130 may be fluidly connected to one another. The bladders 125 and/or the air tube 130 may also be fluidly connected to the tamper mechanism 300. Thus, separation of the indicator 305 from the gasket 350 may result in the bladders 125 and/or the air tube 130 to be exposed to an exterior where air in the bladders 125 may flow out and deflate the bladders 125. IN another example, the shipping box 100 may be configured to be collapsible. The bottom side 105 and the lateral sides 110A-D are described above as being fixed sides. However, the fixed state of these sides may be temporary such as when the shipping box 100 is in use for packaging. The shipping box 100 may be delivered with instructions to collapse the bottom side 105, the lateral sides 110A-D, and the top side 115 so that the shipping box 100 may be returned for reuse. The shipping box 100 may include locking mechanisms holding the bottom side 105 and the lateral sides 110A-D in the fixed position that may be unlocked (e.g., while the bladders 125 are deflated) which releases the sides for folding or collapsing. In this manner, the shipping box 100 may be collapsed into a flatter profile for return delivery.

Figure 18:
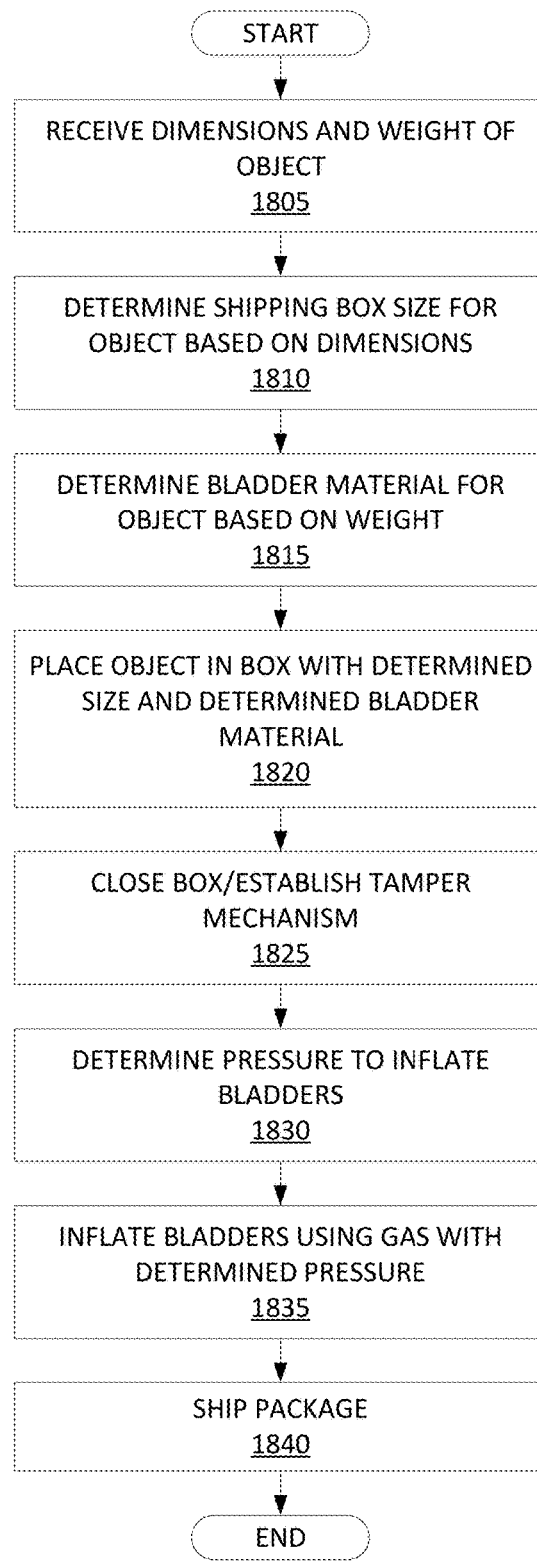
FIG. 18 depicts an exemplary flowchart of a method 1800 illustrating the operations to assemble the exemplary shipping box 100, in accordance with the exemplary embodiments.

FIG. 18 depicts an exemplary flowchart of a method 1800 illustrating the operations to assemble the exemplary shipping box 100, in accordance with the exemplary embodiments. The method 1800 will be described from the perspective of operations being performed on the shipping box 100 such as by a person or machinery. For illustrative purposes, the method 1800 will be described based on machinery that packages the object (e.g., the object 200, 250). The method 1800 will also be described with regard to the shipping box 100 incorporating the tamper mechanism 300, whether the tamper mechanism 300 is embodied as the tamper mechanism 400, the tamper mechanism 500, or a combination thereof.

Figure 19:
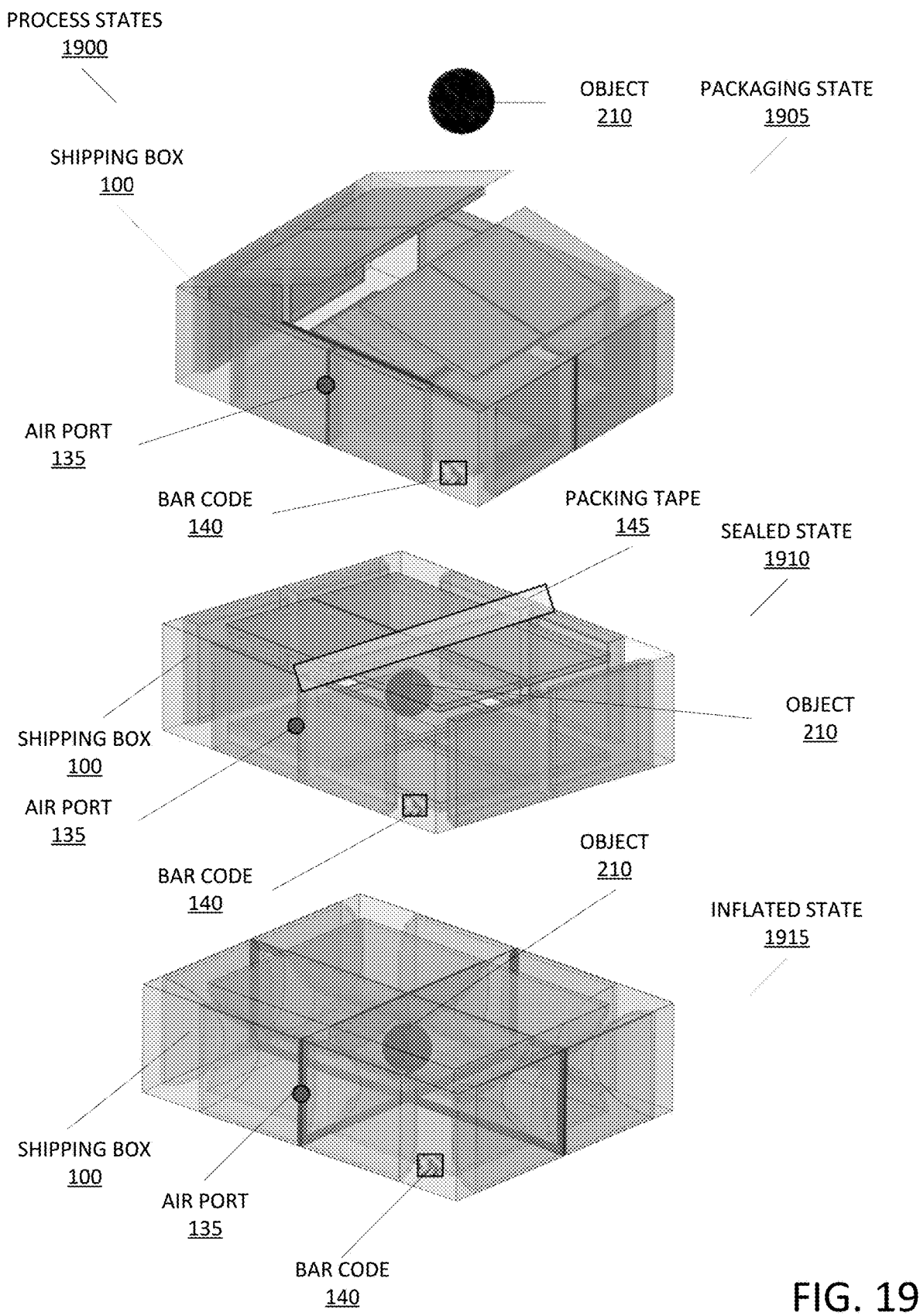
FIG. 19 depicts exemplary process states 1900 of the exemplary shipping box 100 while being assembled, in accordance with the exemplary embodiments.

The method 1800 will also be described in an exemplary implementation, particularly with regard to the machinery assembling the shipping box 100. FIG. 19 depicts exemplary process states 1900 of the exemplary shipping box 100 while being assembled, in accordance with the exemplary embodiments. The process states 1900 relate to states of the shipping box 100 while incorporating assembly of the tamper mechanism 300. The process states 1900 include a packaging state 1905, a sealed state 1910, and an inflated state 1915. The use of the machinery may entail use of other devices and features such as an object feeder (not shown), a barcode reader (not shown), an air pump (not shown), a processing device (not shown), a barcode 140, and packing tape 145.

The machinery may receive dimensions and weight of an object 210 (step 1805). The object 210 may be an object to be sent packaged in the shipping box 100 to a destination. The object 210 may be a small object such as the object 200 or a large object such as the object 250. The object 210 is shown as a substantial sphere. However, the illustrated shape of the object 210 is only illustrative. The object 210 may have any shape including polygonal shapes (e.g., rectangular solid) or indistinct solid shapes (e.g., object conforming shape).

The machinery may be configured to receive or determine the dimensions and the weight of the object 210. In an exemplary embodiment, a user of the machinery may have measured the object 210 to determine the dimensions and the weight of the object 210. The user may enter the measurements into the machinery. In another exemplary embodiment, the machinery may be equipped with measuring devices. For example, the measuring devices may be a weighing scale to measure the weight of the object 210, a visual/imaging camera to obtain dimensions of the object 210, etc. In another example, more complex measuring devices that provide shape information may also be utilized (e.g., three-dimensional laser scanner).

The object 210 may also represent each object that is placed in the shipping box 100. For example, a customer may have ordered a plurality of items from a vendor. The vendor may package each of the items in the same shipping box 100. Accordingly, the object 210 may represent a collection of items where the weight and dimensions of each item is determined in a collective manner and/or an individual manner.

The machinery may determine a size of the shipping box 100 for the object 210 based on the dimensions of the object 210 (step 1810). For example, the machinery may include the processing device that is configured to perform these operations. The machinery may also determine a material for the bladders 125 for the object 210 based on the weight of the object 210 (step 1815). The machinery may determine the size of the shipping box 100 and the bladders 125 individually or as a combination.

In determining the size of the shipping box 100, the machinery may utilize the dimensions of the object 210 and increase each dimension by a predetermined amount. For example, the machinery may utilize a fixed, predetermined amount to determine a minimum size of the shipping box 100 to accommodate the object 210. In another example, the machinery may utilize a dynamic amount based on the bladders 125 that are selected for the packaging (e.g., based on an inflated volume of the bladders 125). The size of the shipping box 100 may be at least partially affected by the bladders 125 that are selected as inflation of the bladders 125 may reduce an available interior volume of the shipping box 100. Accordingly, the bladders 125 that are selected may influence the size of the shipping box 100 to be selected.

In determining the material of the bladders 125, the machinery may utilize the weight of the object 210 so that an appropriate cushioning is provided by the cushioning mechanism including the bladders 125. Specifically, the machinery may determine whether the material of the bladders 125 directed to a relative durability is soft, medium, or stiff. For illustrative purposes, the durability may relate to an amount of tolerance that the material may endure while the bladders 125 are inflated without causing damage during a transit of the shipping box 100. In this scenario, one skilled in the art will recognize that softer materials generally entail lower costs. Accordingly, for financial considerations, the soft material may be preferred. However, the softer materials may not be capable of enduring forces applied by the object 210 having a certain weight. Thus, a more durable material may be selected based on the weight.

In an exemplary embodiment, the machinery may select the material for the bladders 125 based at least in part on the weight of the object 210. Accordingly, as a result of the object 210 falling in a light weight range (e.g., under a first weight threshold), the machinery may select the soft material; as a result of the object 210 falling in a medium weight range (e.g., over the first weight threshold but under a second weight threshold), the machinery may select the medium material; and as a result of the object 210 falling a heavy weight range (e.g., over the second weight threshold), the machinery may select the stiff material. In another exemplary embodiment, the machinery may consider further parameters of the object 210. In an exemplary parameter, the machinery may consider a density of the object 210. By further incorporating the volume or the dimensions of the object 210, the machinery may adjust the material for the bladders 125. Although a weight may define that a certain material is to be used (e.g., stiff material), the density may allow for a different material to be used (e.g., medium material). Thus, a less costly material may be selected. In another exemplary parameter, the machinery may consider a shape of the object 210. By further incorporating the shape of the object 210, the machinery may consider whether a particular pressure may be applied on the bladders 125 (e.g., the object 210 has acute corners, the object 210 is encased in a relatively sharp plastic, etc.). Although a weight may define that a certain material is to be used (e.g., light material), the shape and potentially resulting pressure (e.g., over a small area) may damage the bladders 125 such that a different material is to be used instead (e.g., medium or stiff material). In a further exemplary parameter, the machinery may determine a maximum inflation pressure to inflate the bladders 125. That is, the bladders 125 may not be required to be inflated to a maximum inflation pressure to achieve a maximum potential inflated volume. In this manner, the maximum inflation pressure may be dynamically selected as a selected parameter in which to inflate the bladders 125. In selecting the maximum inflation pressure, the bladders 125 may be inflated to an intended inflated volume that corresponds to securely holding the object 210 in the interior space of the shipping box in the closed or sealed state.

The machinery may further determine an expected amount of turbulence that may be expected during the transit of the shipping box 100. For example, based on historical information gathered during previous transits of the shipping box 100 or other shipping boxes 100 based on the type of transit, the machinery may calculate a median or average amount of turbulence. Based on the turbulence, the size of the shipping box 100, and/or the material of the bladders 125, the machinery may further determine an amount of the inflation pressure to be used in inflating the bladders 125. The machinery may also determine an acceptable amount of relative movement within the interior space of the shipping box 100 that may be allowed. Based on the above factors individually or in combination, the machinery may determine the inflation pressure of the bladders 125 to be used for the object 210.

The above describes an exemplary implementation where the different types of bladders 125 have a substantially similar inflated volume when a maximum inflation pressure is used. However, the use of a maximum inflation pressure and a similar inflated volume is only illustrative. The exemplary embodiments may incorporate bladders 125 that have a further variable to be considered in selecting the size of the shipping box 100 and/or the material of the bladders 125. For example, the inflated volume at the maximum inflation pressure may be a further variable to be considered. Those skilled in the art will appreciate the various manners in which to also modify the above noted selections further based on this variable. For example, the bladders 125 with a smaller inflated volume may entail lesser costs (e.g., less material is used). The smaller inflated volume may also allow for an increased interior volume in which to place the object 210 which may result in a smaller size shipping box 100 to be selected.

Once the shipping box 100 with the bladders 125 has been selected, the machinery may place the object 210 in the shipping box 100 where the shipping box 100 has the determined size and the bladders 125 have the determined material (step 1820). For example, an object feeder of the machinery may place the object 210 that may include one or more items in an interior space of the shipping box 100. The shipping box 100 may be in the packaging state 1905 where the top covers 120A, 120B are pivoted open to allow access to the interior space of the shipping box 100. The bladders 125 may be in a deflated state (e.g., as described in FIGS. 1, 2, 5, 6, 9). As further illustrated in the packaging state 1905 of FIG. 19, the shipping box 100 may include the air port 135 to be used in a subsequent operation, the tamper mechanism 300 (not shown in FIG. 19) to be assembled in a subsequent operation, and the bar code 140. The bar code 140 may be written to include a variety of types of information. As described above, in selecting the size of the shipping box 100 and the material of the bladders 125, the machinery may also determine the inflation pressure to be used in inflating the bladders 125. Accordingly, in a subsequent operation, the machinery may read the bar code 140 that includes information on the inflation pressure to be used with the shipping box 100. The bar code 140 may include information such as the selected shipping box 100, the material of the bladders 125, a recipient identity, an identity of the object 210, a scheduled transit, an order number, etc. Those skilled in the art will appreciate scenarios where the bar code 140 may be used. For example, the machinery may represent a package processing location where the plurality of states of the shipping box 100 are at different areas of the location where different components of the machinery are performing corresponding operations. Thus, the bar code 140 may improve streamlining of the process to assemble the shipping box 100 as the shipping box 100 is processed through the location.

Once the object 210 has been placed in the interior space of the shipping box 100 while the bladders 125 are in the deflated state, the machinery may close and/or seal the shipping box 100 (step 1825). For example, the machinery may include equipment that closes the top covers 120A, 120B. In closing the top covers 120A, 120B, the shipping box 100 may be in the closed state. The machinery may include further equipment that seals the top covers 120A, 120B. For example, the machinery may place the packing tape 145 on the top side 115 across the free edges of the top covers 120A, 120B. In another example, the shipping box 100 may be encased in a wrapping (e.g., cling wrap). Once closed and sealed, the shipping box 100 may be in the sealed state 1910.

In closing the shipping box 100, the tamper mechanism 300 may also be assembled. As described in detail above, the tamper mechanism 300 may include the indicator 305 and the gasket 350. In closing the shipping box 100, the indicator 305 located on the top covers 120A, 120B may couple with the gasket 350 located on the fixed side 110A, 110C, respectively (e.g., as illustrated in FIG. 13). In this manner, the tamper mechanism 300 may be in an unpressurized state (e.g., the unpressurized state 1505, 1705). The closing of the shipping box 100 may therefore also assemble the tamper mechanism 300 via a single operation.

Once sealed, the machinery may proceed to operations that prepare the shipping box 100 for delivery. The machinery may determine the inflation pressure to inflate the bladders 125 (step 1830). As described above, the machinery may include the bar code reader to read the bar code 140. In reading the bar code 140, the machinery may determine the inflation pressure to be used with the shipping box 100. As a result of determining the inflation pressure, the machinery may inflate the bladders 125 using a gas (e.g., air) (step 1835). For example, the machinery may further include an air pump that couples to the air port 135. The air pump may inflate the bladders 125 until the inflation pressure is reached. Once the bladders 125 are inflated, the shipping box 100 may be in the inflated state 1915.

The operation of inflating the bladders 125 may also activate the tamper mechanism 300. As described above with regard to the tamper mechanism 400, the inflating of the bladders 125 may apply a pressure on the gasket membrane 460, resulting in the pin 465 to puncture the membrane 425. The second gas in the second gas receptacle 420 may react with the first gas in the first gas receptacle 415 to create the third gas that has a different color (e.g., reddish brown) from the first and second gases (e.g., colorless). The tamper mechanism 400 may therefore be in the pressurized state 1510. The color of the third gas present in the first gas receptacle 415 through the viewing surface 507 may provide the visual indication that the tamper mechanism 400 is activated and in the pressurized state 1510. As described above with regard to the tamper mechanism 500, the inflating of the bladders 125 may apply a pressure on the gasket membrane 560, resulting in the pin 565 to puncture the membrane 525. The adhesive in the adhesive receptacle 415 may be pushed into the adhesive conduit 520 and bond with the indicator gasket 575 via the adhesive channel 580. The tamper mechanism 500 may therefore be in the pressurized state 1710. The adhesive may have a color such that its presence in the adhesive conduit 520 or visible on the viewing surface 507 may provide the visual indication that the tamper mechanism 500 is activated and in the pressurized state 1710.

As a result of the shipping box 100 being in the sealed state, the bladders 125 in the inflated state, and the tamper mechanism 300 in the pressurized state, the shipping box 100 may be prepared for delivery (step 1840).

The exemplary embodiments describe the system 1300 including a plurality of individual components. For example, the exemplary embodiments describe the shipping box 100, the tamper mechanism 300 embodied as one or both of the tamper mechanisms 400, 500, and the system 1300 that incorporates the tamper mechanism 300 in the shipping box 100. However, the system 1300 is only an exemplary implementation of the exemplary embodiments.

The individual components of the system 1300 may also be utilized in an individual manner. For example, the shipping box 100 may be used to package the object 210 without the tamper mechanism 300. Thus, the shipping box 100 may be used in a conventional packaging objective that provides a cushioning mechanism in the manner described above with regard to the bladders 125. In another example, the tamper mechanism 300 embodied either in the tamper mechanism 400, the tamper mechanism 500, or a combination thereof may be incorporated in another type of box that packages the object 210. Thus, the tamper mechanism 300 may be used with any box that is appropriately modified (e.g., recesses that accommodate the indicator 305 and the gasket 350) such that a security mechanism is provided to indicate tampering of the tamper mechanism 300 and/or the box. When used individually without the bladders 125, the tamper mechanism 300 may be equipped with further components that allow for pressure to be applied to the gasket membrane 460, 560 in a separate operation. For example, the gasket 350 may include an air bladder such that compression of the air bladder through coupling of the indicator 305 with the gasket 350 may provide the necessary pressure. In another example, the gasket 350 may include a further air port in which to receive fluid that applies the pressure.

The exemplary embodiments provide a shipping box with a cushioning mechanism to secure an object placed therein as well as a tamper mechanism to provide a visual indication as to whether the shipping box was received without tampering. The shipping box may be selected to accommodate the object based on dimensions of the object. The cushioning mechanism includes bladders that are inflated after the shipping box has been closed where the bladders are made of a selected material to accommodate a weight of the object. The shipping box and the bladders may be manufactured with reusable materials so that the shipping box may be reused for subsequent packages. The tamper mechanism may be incorporated in the shipping box to seamlessly activate the tamper mechanism while the shipping box is closed. The tamper mechanism provides a visual indication upon activation that identifies whether the shipping box and/or the tamper mechanism has been tampered prior to delivery to the intended recipient. The tamper mechanism may be a single use device that is replaceable for each subsequent use of the shipping box.

It will be apparent to those skilled in the art that various modifications may be made in the present invention, without departing from the spirit or scope of the invention. Thus, it is intended that the present invention cover modifications and variations of this invention provided they come within the scope of the appended claims and their equivalent.

The invention claimed is:

1. A shipping box, comprising:
  a plurality of sides arranged as a rectangular solid, the sides including fixed sides and a top side, the top side including an openable cover for access to an interior of the rectangular solid, the rectangular solid having a size determined based on dimensions of at least one object placed in the interior of the rectangular solid;
  a plurality of bladders arranged on each of the sides, the bladders configured to be inflated as a cushioning mechanism for the at least one object while placed in the interior of the rectangular solid;
  a tamper mechanism comprising an indicator and a gasket, the indicator configured to removably couple to the openable cover, the gasket configured to removably couple to one of the fixed sides, the indicator and the gasket being positioned such that closing the openable cover results in the indicator coupling with the gasket; and
  wherein the indicator includes a first gas receptacle holding a first gas and a second gas receptacle holding a second gas, the first gas being separated from the second gas by a membrane, and wherein the gasket includes a pin configured to puncture the membrane when the tamper mechanism is in a pressurized state so that the first gas reacts with the second gas to create a third gas, the third gas having a visually distinct color, the visually distinct color being visible from an exterior of the shipping box.

2. The shipping box of claim 1, further comprising:
  an air tube fluidly interconnecting the bladders; and
  an air port fluidly connected to the air tube, the air port configured to couple to an air supply to inflate the bladders via the air tube.

3. The shipping box of claim 1, wherein the bladders are fixedly attached to the sides and configured to be inflated to a predetermined inflation pressure to hold the at least one object within the interior space relative to the sides, the predetermined inflation pressure based on the weight of the at least one object to provide a cushioning effect on the at least one object while the shipping box is in transit.

4. The shipping box of claim 1, wherein the third gas being present in the tamper mechanism is indicative of an absence of tampering and the third gas being absent in the tamper mechanism is indicative of tampering of at least one of the shipping box and the tamper mechanism.

5. The shipping box of claim 1, wherein the indicator includes an adhesive receptacle holding an adhesive, the adhesive being held within the adhesive receptacle by a membrane, and wherein the gasket includes a pin configured to puncture the membrane when the tamper mechanism is in a pressurized state so that the adhesive bonds to an indicator membrane on the gasket and forms a fixed seal between the indicator and the gasket.

6. The shipping box of claim 5, wherein the indicator membrane being intact is indicative of an absence of tampering and the indicator membrane being one of broken or discontinuous is indicative of tampering of at least one of the shipping box and the tamper mechanism.

7. The shipping box of claim 1, wherein the shipping box and the bladders are configured to be reused, and wherein the tamper mechanism is configured for a single use such that a further tamper mechanism is configured to replace the tamper mechanism after the single use.

8. A system, comprising:
  a shipping box comprising:
    a plurality of sides arranged as a rectangular solid, the sides including fixed sides and a top side, the top side including an openable cover for access to an interior of the rectangular solid, the rectangular solid having a size determined based on dimensions of at least one object placed in the interior of the rectangular solid;
    a plurality of bladders arranged on each of the sides, the bladders configured to be inflated as a cushioning mechanism for the at least one object while placed in the interior of the rectangular solid;
    a tamper mechanism comprising an indicator and a gasket, the indicator configured to removably couple to the openable cover, the gasket configured to removably couple to one of the fixed sides, the indicator and the gasket being positioned such that closing the openable cover results in the indicator coupling with the gasket; and wherein the indicator includes a first gas receptacle holding a first gas and a second gas receptacle holding a second gas, the first gas being separated from the second gas by a membrane, and wherein the gasket includes a pin configured to puncture the membrane when the tamper mechanism is in a pressurized state so that the first gas reacts with the second gas to create a third gas, the third gas having a visually distinct color, the visually distinct color being visible from an exterior of the shipping box.

\* \* \* \* \*